United States Patent
Osano et al.

(10) Patent No.: US 8,234,428 B2
(45) Date of Patent: Jul. 31, 2012

(54) ARBITRATION DEVICE THAT ARBITRATES CONFLICTS CAUSED IN DATA TRANSFERS

(75) Inventors: Hidekazu Osano, Kawasaki (JP);
Takayuki Kinoshita, Kawasaki (JP);
Yoshikazu Iwami, Kawasaki (JP);
Makoto Hataida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/190,906

(22) Filed: Jul. 26, 2011

(65) Prior Publication Data
US 2011/0283032 A1    Nov. 17, 2011

Related U.S. Application Data

(63) Continuation of application No. PCT/JP2009/000397, filed on Feb. 2, 2009.

(51) Int. Cl.
*G06F 13/368* (2006.01)
(52) U.S. Cl. ........................................ 710/119; 710/124
(58) Field of Classification Search .......... 710/104–125, 710/305–317, 40–45
See application file for complete search history.

(56) References Cited

U.S. PATENT DOCUMENTS

| | | | |
|---|---|---|---|
| 6,119,196 A | 9/2000 | Muller et al. | |
| 6,173,349 B1 * | 1/2001 | Qureshi et al. | 710/110 |
| 6,311,249 B1 * | 10/2001 | Min et al. | 710/111 |
| 6,480,926 B2 * | 11/2002 | Saze et al. | 710/316 |
| 6,587,905 B1 * | 7/2003 | Correale et al. | 710/107 |
| 6,667,984 B1 * | 12/2003 | Chao et al. | 370/414 |
| 6,735,204 B1 | 5/2004 | Wang et al. | |
| 6,823,412 B2 * | 11/2004 | Regis | 710/121 |
| 6,898,649 B2 * | 5/2005 | Goudie | 710/112 |
| 7,007,123 B2 * | 2/2006 | Golla et al. | 710/243 |

(Continued)

FOREIGN PATENT DOCUMENTS

JP    63-278439    11/1988

(Continued)

OTHER PUBLICATIONS

International Search Report for PCT/JP2009/000397, mailed May 19, 2009.

*Primary Examiner* — Raymond Phan
(74) *Attorney, Agent, or Firm* — Fujitsu Patent Center

(57) ABSTRACT

An arbitration device including: a first measuring circuit to measure a first period; a second measuring circuit to measure a second period; a second selection circuit to select and output the first period or the second period according to a first selection signal; a first control circuit to output the first selection signal according to the first period and the second period; a third selection circuit to select a third data or either the first data or the second data according to a second selection signal; a third measuring circuit to measure a third period; a fourth measuring circuit to measure a fourth period; and a second control circuit to output the second selection signal according to either the selected first period or the selected second period and the third period and the fourth period.

8 Claims, 14 Drawing Sheets

U.S. PATENT DOCUMENTS

| | | | |
|---|---|---|---|
| 7,143,219 B1 * | 11/2006 | Chaudhari et al. | 710/111 |
| 7,173,931 B2 * | 2/2007 | Chao et al. | 370/388 |
| 7,302,510 B2 * | 11/2007 | Fredrickson et al. | 710/243 |
| 7,328,286 B2 * | 2/2008 | Vinnemann | 710/9 |
| 7,522,527 B2 * | 4/2009 | Jun et al. | 370/236 |
| 7,995,607 B2 * | 8/2011 | Soloviev | 370/462 |
| 2003/0158986 A1 * | 8/2003 | Hong | 710/113 |
| 2004/0083326 A1 * | 4/2004 | Wang et al. | 710/317 |
| 2004/0156323 A1 * | 8/2004 | Cao | 370/258 |
| 2007/0174529 A1 * | 7/2007 | Rodriguez et al. | 710/240 |

FOREIGN PATENT DOCUMENTS

| | | |
|---|---|---|
| JP | 2000-148513 | 5/2000 |
| JP | 2000-156693 | 6/2000 |
| JP | 2002-508099 | 3/2002 |
| WO | 99/00736 | 1/1999 |

* cited by examiner

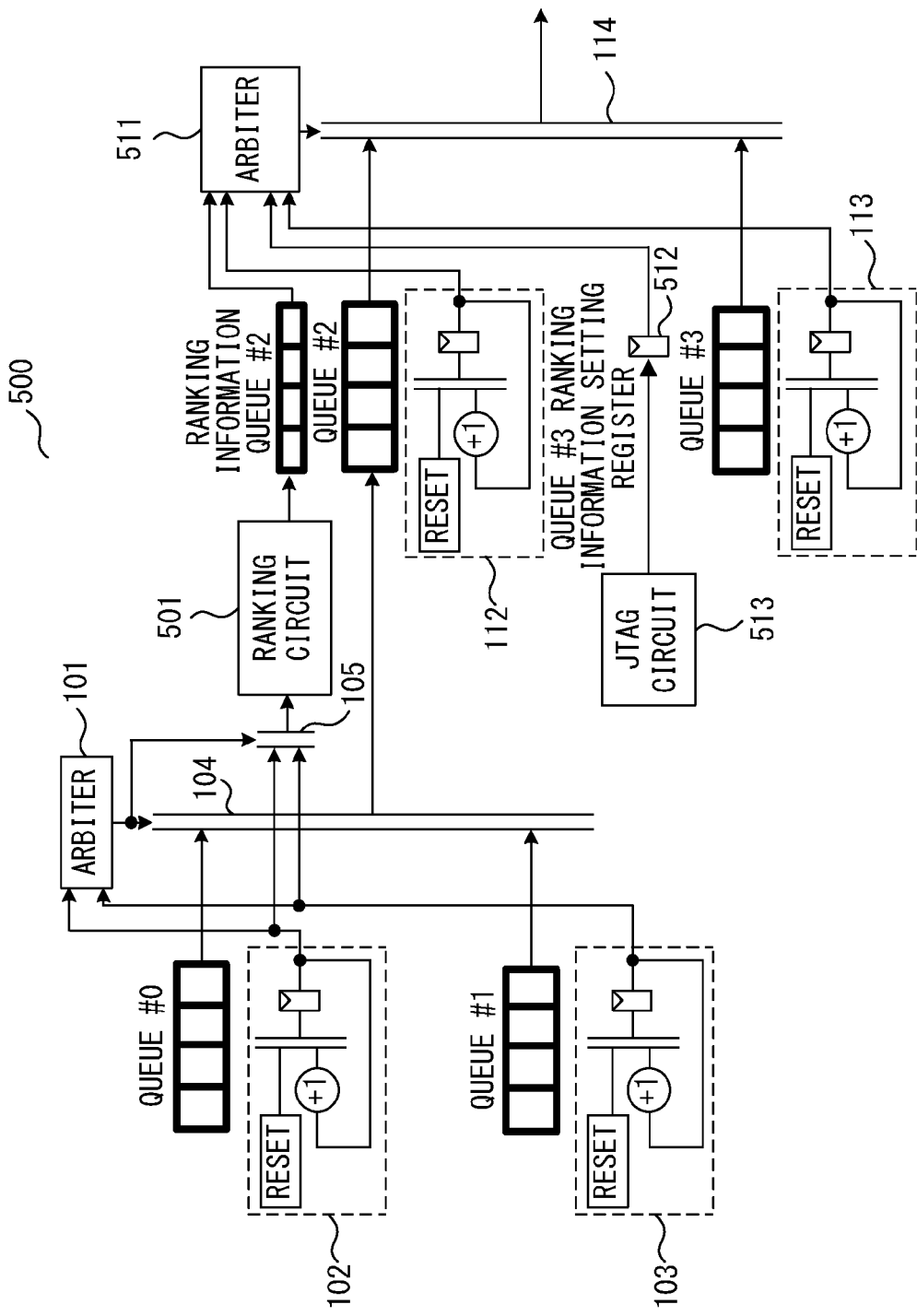
F I G. 5

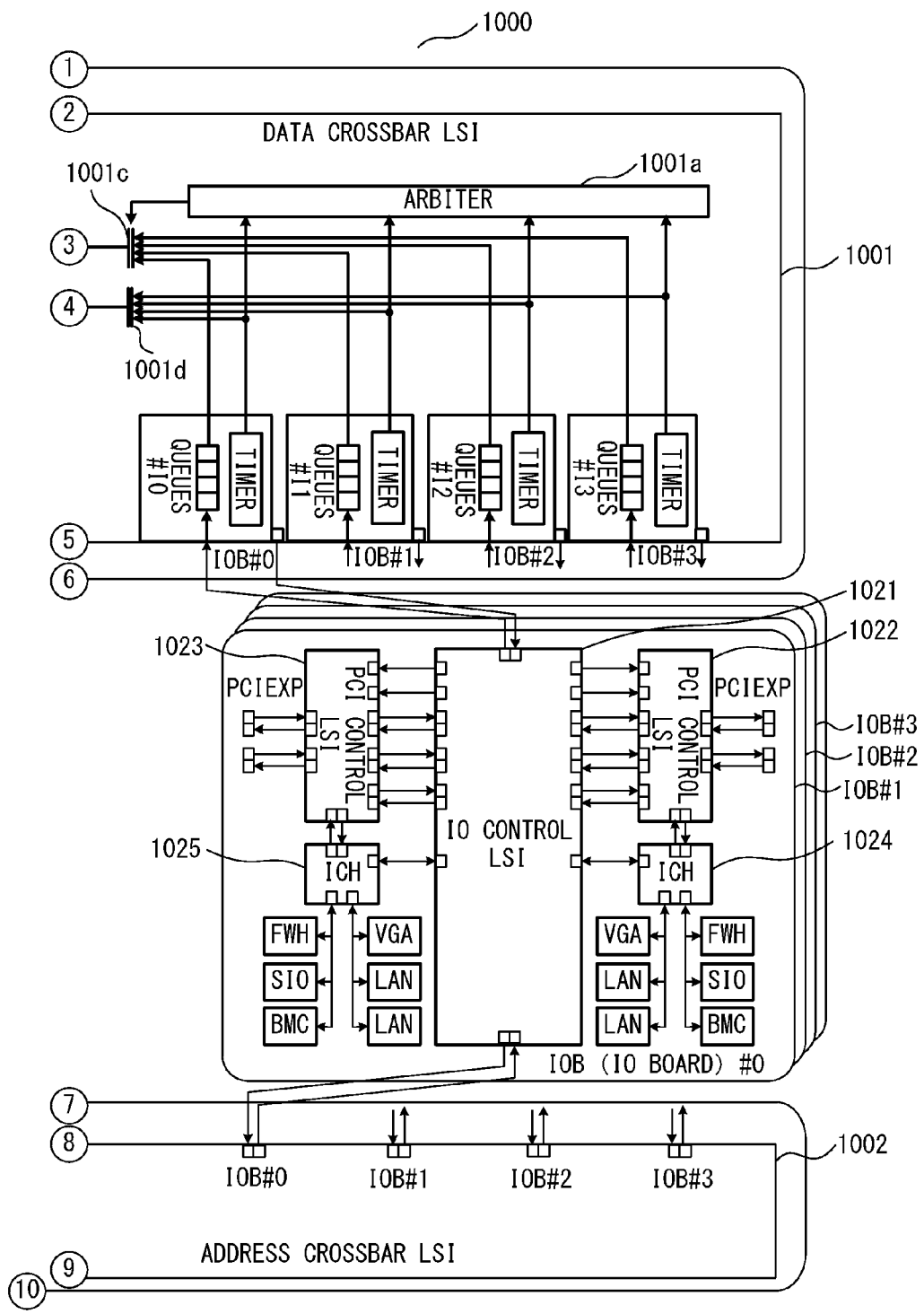
F I G. 10 B

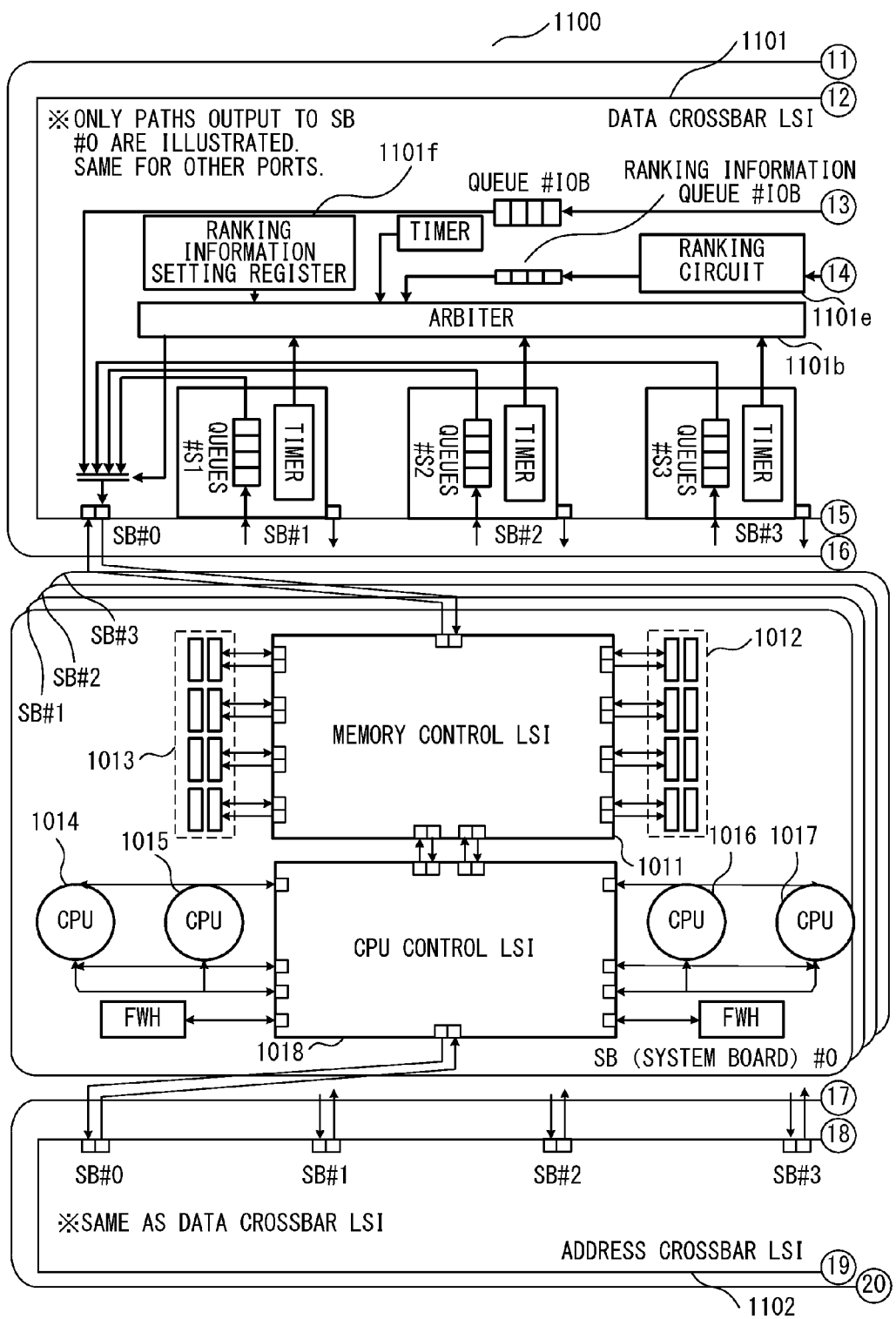
F I G. 11A

US 8,234,428 B2

ARBITRATION DEVICE THAT ARBITRATES CONFLICTS CAUSED IN DATA TRANSFERS

CROSS-REFERENCE TO RELATED APPLICATION

This application is a continuation of PCT application PCT/JP2009/000397, which was filed on Feb. 2, 2009.

FIELD

An embodiment of the present invention relates to an arbitration device that arbitrates a conflict caused in a data transfer such as a packet transfer in a computer system or a communication system.

BACKGROUND

Conventionally, an arbitration circuit is known that arbitrates a conflict caused in a data transfer such as packet transfer processing in a computer system or a communication system. Hereinafter, this arbitration circuit is referred to as an "arbiter".

Some technology for reducing the length of time required for a packet to pass through an arbiter has been developed. For example, such technology has been achieved by monitoring the latency time that elapses after a packet reaches a queue and by increasing the priority level of a packet that has waited for a long time, and thereby reducing the amount of time the packet stays at the queue as much as possible.

In relation to the above-mentioned technology, a communication control device is known that enables good real-time response and fast collision control over the network. This is achieved by increasing the priority of a packet whose number of collisions is equal to or larger than a preset value when the transmission of a packet has failed due to the collision of the packet on the network.

FIG. 12 is a diagram illustrating the related art in which arbiters are provided at multiple levels.

An arbiter 1201 of FIG. 12 compares a timer value of a timer 1202 that measures the latency time of a packet stored in a queue #0 with a timer value of a timer 1203 that measures the latency time of a packet stored in a queue #1. The arbiter 1201 then switches a selector 1204 so as to prioritize an output of the packet whose latency time is longer.

Subsequently, a packet stored in the queue #0 or queue #1 is stored in a queue #2 via the selector 1204.

The arbiter 1211 compares a timer value of a timer 1212 that measures the latency time of a packet stored in the queue #2 with a timer value of a timer 1213 that measures the latency time of a packet stored in the queue #3. The arbiter 1211 then switches a selector 1214 so as to prioritize an output of the packet whose latency time is longer.

Subsequently, a packet stored in the queue #2 or queue #3 is output via the selector 1214. Hereinafter, a circuit in which an arbiter is arranged at multiple levels as illustrated in FIG. 12 is referred to as "multilevel arbiter".

Patent Document 1: Japanese Laid-open Patent Publication No. 63-278439

SUMMARY

According to one aspect of the arbitration device of the present invention, the arbitration device including: a first storage circuit configured to hold inputted first data; a second storage circuit configured to hold inputted second data; a first selection circuit connected to the first storage circuit and the second storage circuit, and configured to select the first data or the second data according to a first selection signal; a first measuring circuit configured to measure a first period during which the first selection circuit selects the first data; a second measuring circuit configured to measure a second period during which the first selection circuit selects the second data; a second selection circuit connected to the first measuring circuit and the second measuring circuit, and configured to select the first period or the second period according to the first selection signal; a first control circuit configured to output the first selection signal according to the first period and the second period; a third storage circuit configured to hold either the first data or the second data which is selected by the first selection circuit; a fourth storage circuit configured to hold inputted third data; a third selection circuit connected to the third storage circuit and the fourth storage circuit, and configured to select the third data or either the first data or the second data which is selected by the first selection circuit according to a second selection signal; a third measuring circuit configured to measure a third period during which the third selection circuit selects either the first data or the second data; a fourth measuring circuit configured to measure a fourth period during which the third selection circuit selects the third data; and a second control circuit configured to output the second selection signal according to either the selected first period or the selected second period and the third period and the fourth period.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating the general outline of a multilevel arbiter according to the second embodiment;

FIG. 10B is a diagram illustrating a main part of the computer system to which a multilevel arbiter according to the first embodiment is applied;

FIG. 11A is a diagram illustrating a main part of the computer system to which a multilevel arbiter according to the second embodiment is applied;

DESCRIPTION OF EMBODIMENTS

As described above, when an arbiter is arranged at multiple levels, an arbiter at the latter level is not informed of how long a packet that passed an arbiter at the former level waited at the arbiter at the former level.

For this reason, it has been difficult for the arbiter at the latter level to determine the priority level of a packet in view of the latency time at the arbiter at the former level. For example, it has been difficult for the arbiter at the latter level to increase the priority level of a packet whose latency time was long at the arbiter at the former level.

As a result, when an arbiter is arranged at multiple levels, there has been a problem wherein it has been difficult to arbitrate the multilevel arbiter so as to shorten the latency time required for a packet to pass through as much as possible.

Some embodiments of the present invention will be described with reference to FIGS. 1-11.

Figure 1:
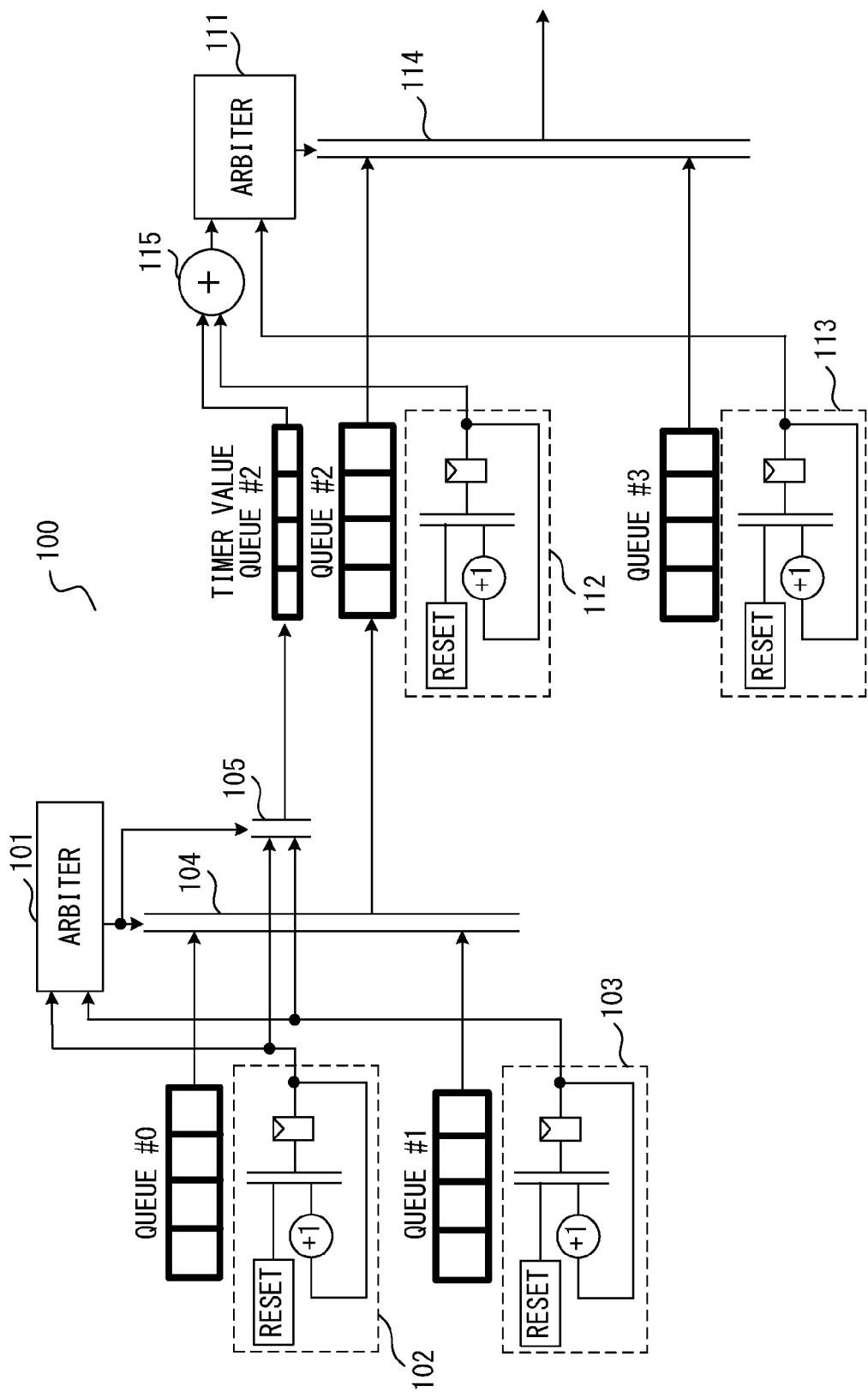
FIG. 1 is a diagram illustrating the general outline of a multilevel arbiter according to the first embodiment.

FIG. 1 is a diagram illustrating the general outline of a multilevel arbiter 100 according to the first embodiment.

The multilevel arbiter 100 of FIG. 1 is provided with an arbiter 101 that generates a selection signal according to a timer value output from a queue #0 timer 102 and a timer value output from a queue #1 timer 103. Hereinafter, a selection signal generated by the arbiter 101 is referred to as a "first selection signal".

The multilevel arbiter 100 is provided with a queue #0 that holds and outputs a packet, and a queue #0 timer 102 that measures a period of time during which the packet is stored in the queue #0 and then is output.

The multilevel arbiter 100 is provided with a queue #1 that holds and outputs a packet, and a queue #1 timer 103 that measures a period of time during which the packet is stored in the queue #1 and then is output.

The multilevel arbiter 100 is provided with a selector 104 that selects a packet output from the queue #0 or a packet output from the queue #1 according to a first selection signal output from the arbiter 101.

The multilevel arbiter 100 is provided with a selector 105 that selects a timer value output from the queue #0 timer 102 or the queue #1 timer 103 according to a first selection signal output from the arbiter 101.

The multilevel arbiter 100 is provided with an arbiter 111 that generates a selection signal according to a timer value output from an adder circuit 115 or a timer value output from queue #2 timer 112. Hereinafter, a selection signal generated by the arbiter 111 is referred to as a "second selection signal".

The multilevel arbiter 100 is provided with a queue #2 that holds and outputs a packet output from the selector 104, a timer value queue #2 that holds and outputs a timer value output from the selector 105, and a queue #2 timer 112 that measures a period of time during which a packet is stored in the queue #2 and then is output.

The multilevel arbiter 100 is provided with a queue #3 that holds and outputs a packet, and a queue #3 timer 113 that measures a period of time during which a packet is stored in the queue #3 and then is output.

The multilevel arbiter 100 is provided with a selector 114 that selects a packet output from the queue #2 or a packet output from the queue #3 according to a second selection signal output from the arbiter 111.

The multilevel arbiter 100 is provided with an adder circuit 115 that adds a timer value output from the timer value queue #2 to a timer value output from the queue #2 timer 112.

Although the queue #0 timer 102 of FIG. 1 is a timer for one packet held in the queue #0, if the queue #0 is capable of holding, for example, four packets at the maximum, four queue #0 timers 102 may be provided for these four packets.

The same may be said for the queue #1 timer 103, the queue #2 timer 112, and the queue #3 timer 113, as well as the queue #4 timer 402, queue #5 timer 403, queue #4 timer 902, and queue #5 timer 903 mentioned below.

Hereinafter, the queue #0 timer 102, the queue #1 timer 103, the queue #2 timer 112, and the queue #3 timer 113 as well as the queue #4 timer 402, the queue #5 timer 403, the queue #4 timer 902, and the queue #5 timer 903 may comprehensively be referred to as a "queue timer".

Here, the output terminals of the queue #0 and the queue #1 are connected to the selector 104.

The output terminal of the queue #0 timer 102 is connected to the arbiter 101 and the selector 105. In a similar manner, the output terminal of the queue #1 timer 103 is connected to the arbiter 101 and the selector 105.

The output terminal of the arbiter 101 is connected to the selector 104 and the selector 105.

The output terminal of the selector 104 is connected to the queue #2. The output terminal of the selector 105 is connected to the timer value queue #2.

The output terminals of the queue #2 and queue #3 are connected to the selector 114. The output terminals of the timer value queue #2 and the queue #2 timer 112 are connected to the adder circuit 115.

The output terminals of the adder circuit 115 and the output terminal of the queue #3 timer 113 are connected to the arbiter 111. The output terminal of the arbiter 111 is connected to the selector 114.

In the above-described configuration, the queue #0 sequentially stores input packets, and outputs the packets to the selector 104 in the storing order. It is to be noted that the queue #0 is a storage unit that realizes the FIFO (First In First Out) of data. The same may be said for the queues #1-#5 mentioned below.

The queue #0 timer 102 measures a period of time during which a packet is stored in the queue #0 and the stored packet is then selected and output by the selector 104, and outputs the measured timer value to the arbiter 101 and the selector 105.

The queue #1 sequentially stores input packets, and outputs the packets to the selector 104 in the storing order.

The queue #1 timer 103 measures a period of time during which a packet is stored in the queue #1 and the stored packet is then selected and output by the selector 104, and outputs the measured timer value to the arbiter 101 and the selector 105.

The arbiter 101 compares a timer value output from the queue #0 timer 102 with a timer value output from the queue #1 timer 103.

The arbiter 101 then generates a first selection signal for the selector 104 to select an output of the queue in which the timer value is larger, i.e., a first selection signal for the selector 105 to select an output of queue timer of the queue in which the timer value is larger. The arbiter 101 outputs the first selection signal to the selector 104 and the selector 105.

The selector 104 output a packet output from the queue #0 or a packet output from the queue #1 to the queue #2 in accordance with the first selection signal output from the arbiter 101.

The selector 105 outputs a timer value output from the queue #0 timer 102 or a timer value output from the queue #1 timer 103 to the timer value queue #2 in accordance with the first selection signal output from the arbiter 101.

The queue #2 sequentially stores a packet output from the selector 104, and outputs the packet to the selector 114 in the storing order.

The queue #2 timer 112 measures a period of time during which a packet is stored in the queue #2 and the stored packet is then selected and output by the selector 114, and outputs the measured timer value to the adder circuit 115.

The timer value queue #2 sequentially stores a timer value output from the selector 105, and outputs packets to the adder circuit 115 in the storing order.

The queue #3 sequentially stores input packets, and outputs the packets to the selector 114 in the storing order.

The queue #3 timer 113 measures a period of time during which a packet is stored in the queue #3 and the stored packet is then selected and output by the selector 114, and outputs the measured timer value to the arbiter 111.

The adder circuit 115 adds a timer value output from the timer value queue #2 to a timer value output from the queue #2 timer 112, and outputs a resultant value of the addition, to the arbiter 111.

The arbiter 111 compares a timer value output from the adder circuit 115 with a timer value output from the queue #3 timer 113.

Subsequently, the arbiter 111 generates a selection signal for the selector 114 to select an output of the queue in which the timer value is larger.

For example, when a timer value output from the adder circuit 115 is larger than a timer value output from the queue #3 timer 113, the arbiter 111 generate a selection signal for the selector 114 to select the queue #2.

When a timer value output from the queue #3 timer 113 is larger than a timer value output from the adder circuit 115, the arbiter 111 generates a selection signal for the selector 114 to select the queue #3.

The arbiter 111 then outputs the generated selection signal to the selector 114. Hereinafter, a selection signal generated by the arbiter 111 will be referred to as a "second selection signal".

The selector 114 outputs a packet output from the queue #2 or a packet output from the queue #3 in accordance with a second selection signal output from the arbiter 111.

Figure 2:
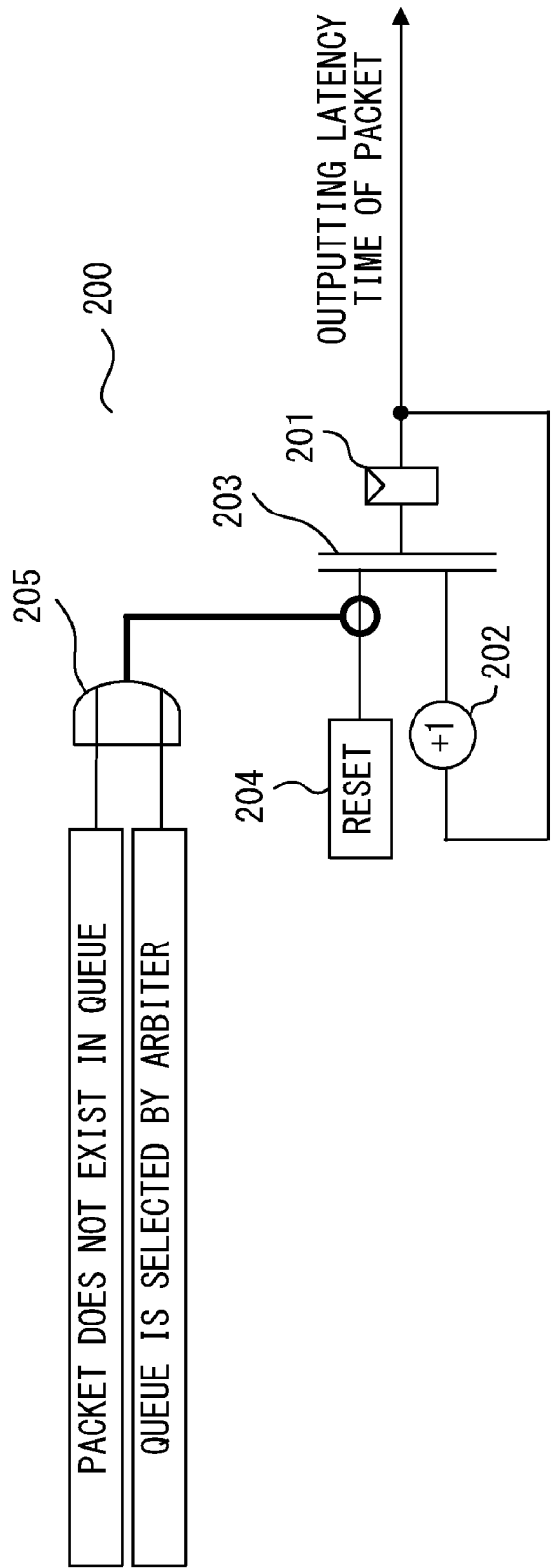
FIG. 2 is a diagram illustrating a queue timer according to the first embodiment or the second embodiment.

FIG. 2 is a diagram illustrating a queue timer according to the first embodiment or the second embodiment.

The queue timer 200 is provided with a latching circuit 201 that holds and outputs a timer value, an adder circuit 202 that adds "1" to a timer value output from the latching circuit 201 and then outputs a resultant value of the addition, to the selector 203, a selector 203, a reset 204, and an logical sum circuit 205.

The output terminal of the latching circuit 201 is connected to the adder circuit 202. The output terminals of the adder circuit 202 and the reset 204 are connected to the selector 203. The output terminal of the logical sum circuit 205 is connected to the selector 203.

In FIG. 2, the output terminal of the logical sum circuit 205 which is indicated by a circle sign "o" intersects with the line connecting the output terminal of the reset 204 to the selector 203. This indicates that when the output terminal indicated by the circle sign "o", i.e., the logical sum circuit 205, outputs "1", the selector 203 selects an output signal output from the resent 204. The same may be said for the other drawings.

In the above-described configuration, the latching circuit 201 holds and outputs a timer value output from the selector 203.

The adder circuit 202 adds just "1" to a timer value output from the latching circuit 201. The adder circuit 202 then outputs to the selector 203 the timer value to which "1" is added.

The reset 204 constantly outputs a timer value 0 in order to initialize a value held in the latching circuit 201.

The selector 203 selects a timer value output from the adder circuit 202 or a timer value 0 output from the reset 204 in accordance with a signal output from the logical sum circuit 205, and outputs the selected value to the latching circuit 201.

In the present embodiment, the selector 203 selects an output signal from the reset 204 when "1" is input from the logical sum circuit 205. The selector 203 selects an output signal from the adder circuit 202 when "0" is input from the logical sum circuit 205.

Here, when a packet does not exist in a queue, or when a packet exists in a queue and the queue is selected by an arbiter, "1" is input from the queue to the logical sum circuit 205.

Figure 3:
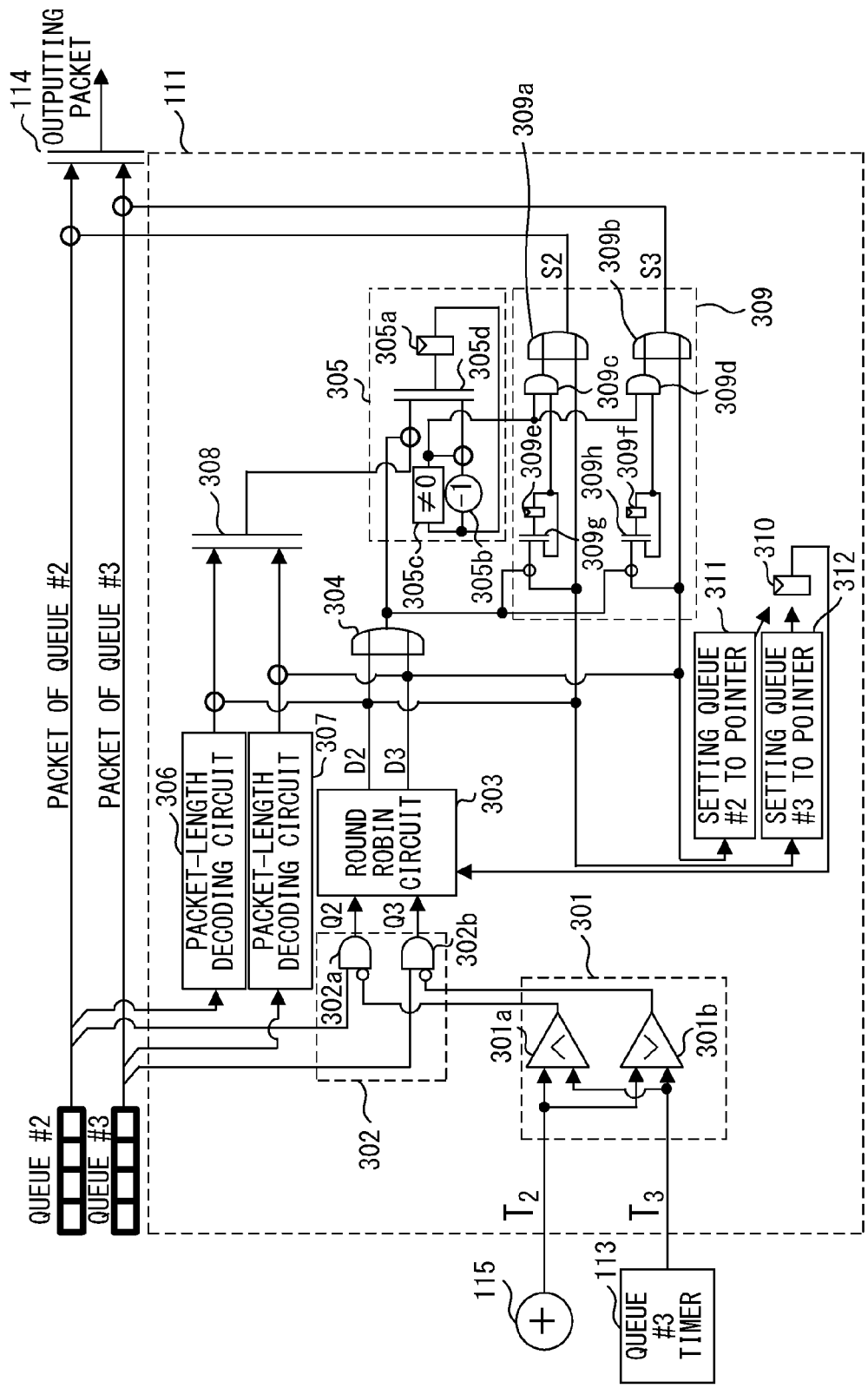
FIG. 3 is a diagram illustrating a specific configuration of an arbiter used in a multilevel arbiter according to the first embodiment.

FIG. 3 is a diagram illustrating a specific configuration of the arbiter 111 according to the first embodiment. As the arbiter 101 and the arbiter 111 of FIG. 1 have a similar configuration, only the arbiter 111 is illustrated in FIG. 3.

The arbiter 111 is provided with a timer value comparator circuit 301 for comparing the size between a timer value output from the adder circuit 115 and a timer value output from the queue #3 timer 113. The timer value comparator circuit 301 is provided with a comparator circuit 301a and a comparator circuit 301b.

The arbiter 111 is provided with a masking circuit 302 for masking a request signal from queue #2 or a request signal from queue #3 according to a signal from the timer value comparator circuit 301. The masking circuit 302 is provided with a logical product circuit 302a and a logical product circuit 302b.

The arbiter 111 is provided with a round robin circuit 303 for sequentially selecting queues when request signals input from the queue #2 and queue #3 via the masking circuit 302 conflict with each other.

Although the round robin circuit 303 is used in the present embodiment, a fixed arbiter or an LRU (Least Recently Used) circuit may be used. The same may be said for FIG. 7 mentioned below.

The arbiter 111 is provided with an logical sum circuit 304.

Moreover, the arbiter 111 is provided with a packet-length measuring circuit 305 for measuring the packet-length selected by the round robin circuit 303. The packet-length measuring circuit 305 is provided with a latching circuit 305a that holds packet length, a subtraction circuit 305b, a detection circuit 305c that outputs a detection signal only when a predetermined condition is met, and a selector 305d.

The arbiter 111 is provided with a packet-length decoding circuit 306 for detecting and decoding a packet length from a head packet output from the queue #2, and a packet-length decoding circuit 307 for detecting and decoding a packet length from a head packet output from the queue #3.

The arbiter 111 is provided with a selector 308.

Moreover, the arbiter 111 is provided with a selection signal output circuit 309 that outputs a second selection signal to the selector 114 while measuring is performed by the packet-length measuring circuit 305. The selection signal output circuit 309 is provided with logical sum circuits 309a and 309b, logical product circuits 309c and 309d, latching circuits 309e and 309f, and selectors 309g and 309h.

The arbiter 111 is provided with a pointer 310 for storing the information about a queue (queue #2 or queue #3) selected by the round robin circuit 303.

Moreover, the arbiter 111 is provided with a pointer setting circuit 311 for setting the information about the queue #2 to the pointer 310, and a pointer setting circuit 312 for setting the information about the queue #3 to the pointer 310.

Here, the output terminals of the adder circuit 115 and the queue #3 timer 113 are connected to the comparator circuit 301a of the timer value comparator circuit 301. In a similar manner, the output terminals of the adder circuit 115 and the queue #3 timer 113 are connected to the comparator circuit 301b of the timer value comparator circuit 301.

The output terminal of the comparator circuit 301a is connected to the logical product circuit 302a of the masking circuit 302 via an inversion circuit. The output terminal of the queue #2 is also connected to the logical product circuit 302a of the masking circuit 302.

The output terminal of the comparator circuit 301b is connected to the logical product circuit 302b of the masking circuit 302 via an inversion circuit. The output terminal of the queue #3 is also connected to the logical product circuit 302b of the masking circuit 302.

The output terminals of the logical product circuit 302a and logical product circuit 302b are connected to the round robin circuit 303.

One of the two output terminals of the round robin circuit 303 is connected to the logical sum circuit 304, the selector 308, an logical sum circuit 309a and selector 309g of the selection signal output circuit 309, and the pointer setting circuit 312.

The other output terminal of the round robin circuit 303 is connected to the logical sum circuit 304, the selector 308, an logical sum circuit 309b and selector 309h of the selection signal output circuit 309, and the pointer setting circuit 311.

The output terminal of the logical sum circuit 304 is connected to a selector 305d of the packet-length measuring circuit 305, and selectors 309g and 309h of the selection signal output circuit 309.

On the other hand, the output terminal of the queue #2 is connected to the packet-length decoding circuit 306, and the output terminal of the queue #3 is connected to the packet-length decoding circuit 307. Further, the output terminals of the packet-length decoding circuit 306 and packet-length decoding circuit 307 are connected to the selector 308.

The output terminal of the selector 308 is connected to the selector 305d of the packet-length measuring circuit 305.

The output terminal of the latching circuit 305a is connected to the subtraction circuit 305b and the detection circuit 305c. The output terminal of the subtraction circuit 305b is connected to the selector 305d. The output terminal of the detection circuit 305c is connected to the selector 305d, and the logical product circuits 309c and 309d of the selection signal output circuit 309.

The output terminal of a latching circuit 309e is connected to a logical product circuit 309c and a selector 309g. The output terminal of the selector 309g is connected to the latching circuit 309e. Moreover, the output terminal of the logical product circuit 309c is connected to the logical sum circuit 309a.

The output terminal of a latching circuit 309f is connected to a logical product circuit 309d and a selector 309h. The output terminal of the selector 309h is connected to the latching circuit 309f. Moreover, the output terminal of the logical product circuit 309d is connected to the logical sum circuit 309b.

The output terminals of the logical sum circuit 309a and logical sum circuit 309b are connected to the selector 114.

The output terminals of the pointer setting circuit 311 and pointer setting circuit 312 are connected to the pointer 310. Further, the output terminal of the pointer 310 is connected to the round robin circuit 303.

In the above-described configuration, the comparator circuit 301a compares a timer value T2 output from the adder circuit 115 with a timer value T3 output from the queue #3 timer 113. The comparator circuit 301a outputs "1" when "T2<T3", and outputs "0" when "T2≧T3".

The comparator circuit 301b compares a timer value T2 output from the adder circuit 115 with a timer value T3 output from the queue #3 timer 113. The comparator circuit 301b outputs "1" when "T2>T3", and outputs "0" when "T2≦T3".

The logical product circuit 302a outputs a logical product of a request signal from queue #2 and an inversion signal of an output signal output from the comparator circuit 301a.

For example, the comparator circuit 301a outputs "1" when T2<T3, and thus "0" is input to the logical product circuit 302a that is connected to the comparator circuit 301a via an inversion circuit. In this instance, the logical product circuit 302a outputs "0".

The comparator circuit 301a outputs "0" when T2≧T3, and thus "1" is input to the logical product circuit 302a. In this instance, once a request signal is input from the queue #2, the logical product circuit 302a outputs a request signal from the queue #2. It is to be noted that the queue #2 outputs "1" as a request signal.

The logical product circuit 302b outputs a logical product of a request signal from the queue #3 and an inversion signal of an output signal output from the comparator circuit 301b.

For example, the comparator circuit 301b outputs "1" when T2>T3, and thus "0" is input to the logical product circuit 302b that is connected to the comparator circuit 301b via an inversion circuit. In this instance, the logical product circuit 302b outputs "0".

The comparator circuit 301b outputs "0" when T2≦T3, and thus "1" is input to the logical product circuit 302b. In this instance, once a request signal is input from the queue #3, the logical product circuit 302b outputs a request signal from the queue #3. It is to be noted that the queue #3 outputs "1" as a request signal.

The round robin circuit 303 compares an output signal Q2 output from the logical product circuit 302a with an output signal Q3 output from the logical product circuit 302b.

(1) When Q2≠Q3, the round robin circuit 303 determines a queue to be selected in accordance with an output signal output from the masking circuit 302. The round robin circuit 303 then generates selection queue determination signals D2 and D3 that indicate the selected queue.

For example, when Q2=1 and Q3=0, the round robin circuit 303 determines to select the queue #2. The round robin circuit 303 then generates selection queue determination signals of D2=1 and D3=0.

When Q2=0 and Q3=1, the round robin circuit 303 determines to select the queue #3. The round robin circuit 303 then generates selection queue determination signals of D2=0 and D3=1.

When a selection queue determination signal is generated, the round robin circuit 303 outputs a selection queue determination signal D2 to the logical sum circuit 304, the selector 308, the selection signal output circuit 309, and the pointer setting circuit 312. In a similar manner, the round robin circuit 303 outputs a selection queue determination signal D3 to the logical sum circuit 304, the selector 308, and the pointer setting circuit 311.

(2) When Q2=Q3, the round robin circuit 303 determines a queue indicated by the information stored in the pointer 310.

Hereinafter, the information that specifies a queue stored in the pointer 310 will be referred to as "queue specifying information".

For example, the queue specifying information may be 2-bits of information. When the queue specifying information is "10 (binary)", the queue specifying information indicates the queue #2. When the queue specifying information is "11 (binary)", the queue specifying information indicates the queue #3. It is to be noted that the queue specifying information is not limited to 2-bits of information.

Once a queue is specified, the round robin circuit 303 generates selection queue determination signals D2 and D3 for selecting the specified queue.

For example, when Q2=Q3=1 and queue specifying information "10 (binary)" is stored in the pointer 310, the round robin circuit 303 generates a selection queue determination signal (D2=1, D3=0) for selecting the queue #2.

When Q2=Q3=1 and queue specifying information "11 (binary)" is stored in the pointer 310, the round robin circuit 303 generates a selection queue determination signal (D2=0, D3=1) for selecting the queue #3.

Once a selection queue determination signal is generated, the round robin circuit 303 outputs a selection queue determination signal D2 to the logical sum circuit 304, the selector 308, the selection signal output circuit 309, and the pointer setting circuit 312. In a similar manner, the round robin circuit 303 outputs a selection queue determination signal D3 to the logical sum circuit 304, the selector 308, and the pointer setting circuit 311.

The logical sum circuit 304 outputs the logical sum of selection queue determination signals D2 and D3 that are output from the round robin circuit 303 to the selector 305d of the packet-length measuring circuit 305, and to selectors 309g and 309h of the selection signal output circuit 309.

On the other hand, the selector 308 selects an output signal of the packet-length decoding circuit 306 or an output signal of the packet-length decoding circuit 307 in accordance with the selection queue determination signals D2 and D3 output from the round robin circuit 303, and outputs the selected output signal to the selector 305d.

For example, when D2=1 and D3=0 in a selection queue determination signal input from the round robin circuit 303, the selector 308 selects an output signal of the packet-length decoding circuit 306, and outputs the selected output signal to the selector 305d.

When D2=0 and D3=1 in a selection queue determination signal input from the round robin circuit 303, the selector 308 selects an output signal of the packet-length decoding circuit 307, and outputs the selected output signal to the selector 305d.

Once a logical sum "1" is newly input from the logical sum circuit 304, the selector 305d selects an output signal of the selector 308, and outputs the selected output signal to the latching circuit 305a. Subsequently, the packet-length data of a head packet of the queue #2 or queue #3 output from the selector 308 is set to the latching circuit 305a.

The subtraction circuit 305b subtracts just "1" from the packet-length data output from the latching circuit 305a. The subtraction circuit 305b then outputs a resultant value of the subtraction to the selector 305d.

Once a logical sum "0" is input from the logical sum circuit 304, the selector 305d selects an output signal output from the subtraction circuit 305b, and outputs the selected output signal to the latching circuit 305a. Subsequently, the latching circuit 305a holds a value output from the subtraction circuit 305b. In other words, a value from which just "1" is subtracted is set to the latching circuit 305a.

The subtraction circuit 305b repeats these operations until the value of the latching circuit 305a becomes "0".

The detection circuit 305c determines whether or not the value held in the latching circuit 305a is "0". When the value held in the latching circuit 305a is not "0", the latching circuit 305a outputs "1" to the logical product circuits 309c and 309d of the selection signal output circuit 309.

Once a logical sum "1" is newly input from the logical sum circuit 304, the selector 309g selects a selection queue determination signal D2 output from the round robin circuit 303, and outputs the selected selection queue determination signal D2 to the latching circuit 309e. Subsequently, the selection queue determination signal D2 is set to the latching circuit 309e. Afterward, the latching circuit 309e holds the set value while a logical sum "0" is being input from the logical sum circuit 304 to the selector 309g.

Once a logical sum "1" is newly input from the logical sum circuit 304, the selector 309h selects a selection queue determination signal D3 output from the round robin circuit 303, and outputs the selected selection queue determination signal D3 to the latching circuit 309f. Subsequently, the selection queue determination signal D3 is set to the latching circuit 309f. Afterward, the latching circuit 309f holds the set value while a logical sum "0" is being input from the logical sum circuit 304 to the selector 309h.

When an output from the detection circuit 305c and latching circuit 309e is "1", the logical product circuit 309c outputs "1" to the logical sum circuit 309a. In other words, when a value held in the latching circuit 305a is not "0" and a value held in the latching circuit 309e is "1", the logical product circuit 309c outputs "1" to the logical sum circuit 309a.

When an output from the detection circuit 305c and latching circuit 309f is "1", the logical product circuit 309d outputs "1" to the logical sum circuit 309b. In other words, when a value held in the latching circuit 305a is not "0" and a value held in the latching circuit 309f is "1", the logical product circuit 309d outputs "1" to the logical sum circuit 309b.

The logical sum circuit 309a outputs to the selector 114 a logical sum S2 of a selection queue determination signal D2 output from the round robin circuit 303 and an output signal output from the logical product circuit 309c. The logical sum circuit 309b outputs to the selector 114 a logical sum S3 of a selection queue determination signal D3 output from the round robin circuit 303 and an output signal output from the logical product circuit 309d.

These output signals S2 and S3 output from the selection signal output circuit 309 become a second selection signal.

When a second selection signal S2 output from the selection signal output circuit 309 is equal to "1", the selector 114 selects and outputs an output signal output from the queue #2, i.e., a packet output from the queue #2.

When a second selection signal S3 output from the selection signal output circuit 309 is equal to "1", the selector 114 selects and outputs an output signal output from the queue #3, i.e., a packet output from the queue #3.

When a selection queue determination signal D3=1 is input from the round robin circuit 303, i.e., when the round robin circuit 303 selects the queue #3, the pointer setting circuit 311 sets queue specifying information "10 (binary)" that represents the queue #2 to the pointer 310.

When a selection queue determination signal D2=1 is input from the round robin circuit 303, i.e., when the round robin circuit 303 selects the queue #2, the pointer setting circuit 312 sets queue specifying information "11 (binary)" that represents the queue #2 to the pointer 310.

Figure 4:
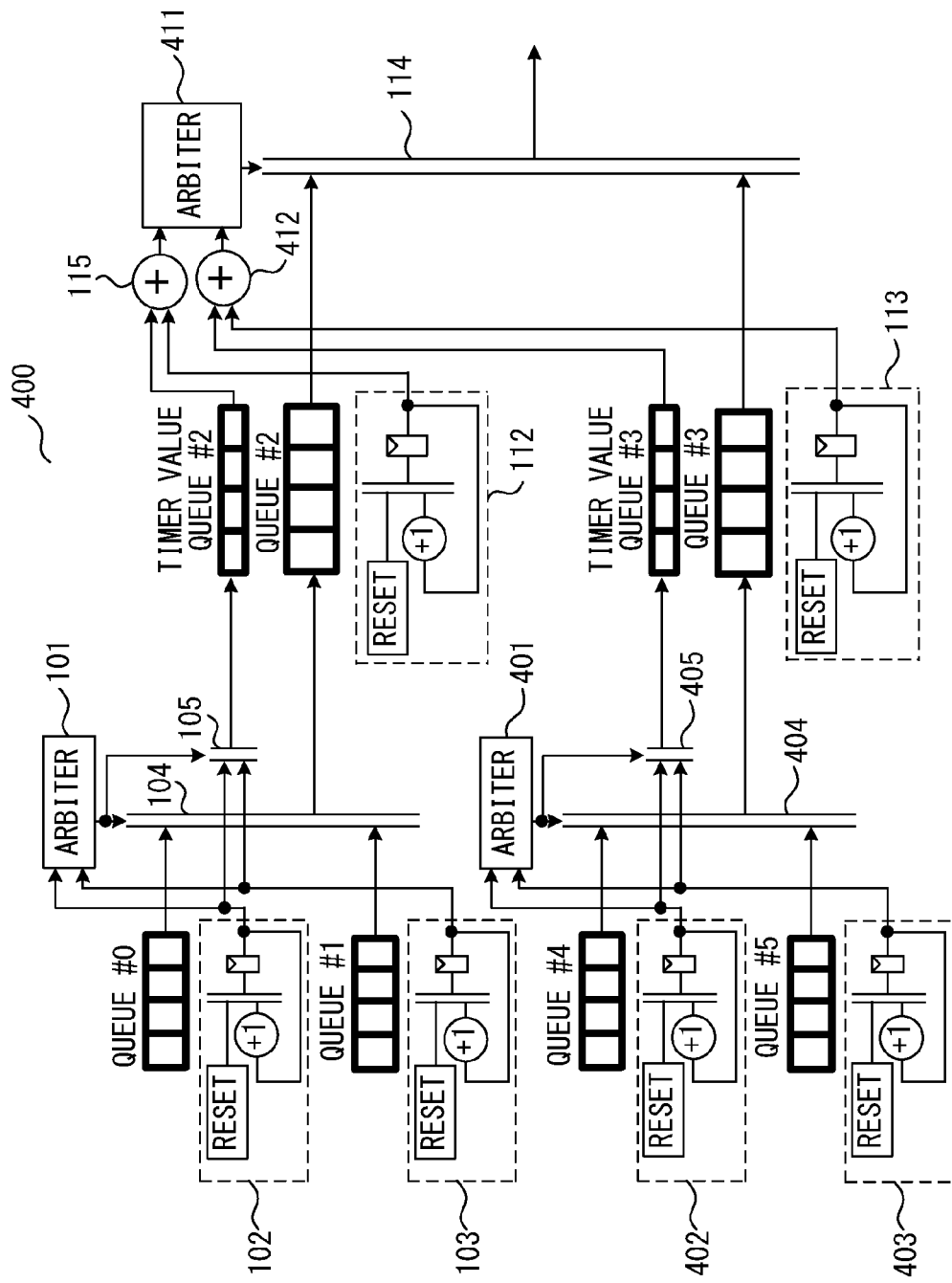
FIG. 4 is a diagram illustrating a modification of a multilevel arbiter according to the first embodiment.

FIG. 4 is a diagram illustrating a modification of the multilevel arbiter 100 according to the first embodiment. The descriptions that overlap with those of the multilevel arbiter 100 of FIG. 1 will be omitted.

In addition to the configuration of the multilevel arbiter 100 of FIG. 1, a multilevel arbiter 400 of FIG. 4 is provided with the following elements.

The multilevel arbiter 400 is provided with an arbiter 401 that generates a selection signal according to a timer value output from a queue #4 timer 402 and a timer value output from a queue #5 timer 403. Hereinafter, a selection signal generated by the arbiter 401 will be referred to as a "third selection signal".

The multilevel arbiter 400 is provided with a queue #4 that holds and outputs a packet as well as a queue #4 timer 402 that measures a period of time during which a packet is stored in the queue #4 and then is output.

The multilevel arbiter 400 is provided with a queue #5 that holds and outputs a packet as well as a queue #5 timer 403 that measures a period of time during which a packet is stored in the queue #5 and then is output.

The multilevel arbiter 400 is provided with a selector 404 that selects and outputs a packet output from the queue #4 or a packet output from the queue #5 according to a third selection signal output from the arbiter 401.

The multilevel arbiter 400 is provided with a selector 405 that selects a timer value output from the queue #4 timer 402 or a timer value output from the queue #5 timer 403 according to a selection signal output from the arbiter 401.

The multilevel arbiter 400 is provided with a timer value queue #3 that holds and outputs a timer value output from the selector 405, and an adder circuit 412 that adds a timer value output from the timer value queue #3 to a timer value output from the queue #3 timer 113.

The multilevel arbiter 400 is provided with an arbiter 411 that generates a second selection signal according to a timer value output from the adder circuit 115 and a timer value output from the adder circuit 412.

Here, the output terminals of the queue #4 and the queue #5 are connected to the selector 404.

The output terminal of the queue #4 timer 402 is connected to the arbiter 401 and the selector 405. In a similar manner, the output terminal of the queue #5 timer 403 is connected to the arbiter 401 and the selector 405.

The output terminal of the arbiter 401 is connected to the selector 404 and the selector 405.

The output terminal of the selector 404 is connected to the queue #3. The output terminal of the selector 405 is connected to the timer value queue #3.

The output terminal of the timer value queue #3 and the output terminal of the queue #3 timer 113 are connected to the adder circuit 412. The output terminal of the adder circuit 412 is connected to the arbiter 411. The output terminal of the arbiter 411 is connected to the selector 114.

In the above-described configuration, the queue #4 sequentially stores input packets, and outputs the packets to the selector 404 in the storing order.

The queue #4 timer 402 measures a period of time during which a packet is stored in the queue #4 and the stored packet is then selected and output by the selector 404, and outputs the measured timer value to the arbiter 401 and the selector 405.

The queue #5 sequentially stores input packets, and outputs the packets to the selector 404 in the storing order.

The queue #5 timer 403 measures a period of time during which a packet is stored in the queue #5 and the stored packet is then selected and output by the selector 404, and outputs the measured timer value to the arbiter 401 and the selector 405.

The arbiter 401 compares a timer value output from the queue #4 timer 402 with a timer value output from the queue #5 timer 403. The arbiter 401 then generates a third selection signal for the selector 404 to select an output of the queue in which the time value is larger, i.e., a third selection signal for the selector 404 to select an output of a queue timer of the queue in which the time value is larger. The arbiter 401 outputs a third selection signal to the selector 404 and the selector 405.

The selector 404 outputs a packet output from the queue #4 or a packet output from the queue #5 to the queue #3 in accordance with a third selection signal output from the arbiter 401.

The selector 405 outputs a timer value output from the queue #4 timer 402 or a timer value output from the queue #5 timer 403 to the timer value queue #3 in accordance with a third selection signal output from the arbiter 401.

The timer value queue #3 sequentially stores a timer value output from the selector 405, and outputs packets to the adder circuit 412 in the storing order.

The queue #3 timer 113 measures a period of time during which a packet is stored in the queue #3 and the stored packet is then selected and output by the selector 114, and outputs the measured timer value to the adder circuit 412.

The adder circuit 412 adds a timer value output from the timer value queue #3 to a timer value output from the queue #3 timer 113, and outputs a resultant value of the addition, to the arbiter 411.

The arbiter 411 compares a timer value output from the adder circuit 115 with a timer value output from the adder circuit 412.

Moreover, the arbiter 411 generates a second selection signal for the selector 114 to select an output of the queue in which the timer value is larger.

For example, when a timer value output from the adder circuit 115 is larger than a timer value output from the adder circuit 412, the arbiter 411 generates a second selection signal for the selector 114 to select the queue #2.

When a timer value output from the adder circuit 412 is larger than a timer value output from the adder circuit 115, the arbiter 411 generates a second selection signal for the selector 114 to select the queue #3.

Subsequently, the arbiter 411 outputs the generated second selection signal to the selector 114.

The selector 114 outputs a packet output from the queue #2 or a packet output from the queue #3 in accordance with the second selection signal output form the arbiter 411.

The configuration of the arbiter 401 of FIG. 4 is the same as that of FIG. 3, and thus the detailed description will be omitted.

FIG. 5 is a diagram illustrating the general outline of a multilevel arbiter 500 according to the second embodiment. The descriptions that overlap with those of the multilevel arbiter 100 of FIG. 1 will be omitted.

The multilevel arbiter 500 is provided with a ranking circuit 501 for ranking the queue #2 according to a timer value output from the selector 105.

The multilevel arbiter 500 is provided with a ranking information queue #2 for holding and outputting the ranking information output from the ranking circuit 501.

The multilevel arbiter 500 is provided with a queue #3 ranking information setting register 512 for preliminarily storing the ranking information of the queue #3, and a JTAG circuit 513 for setting ranking information to the queue #3 ranking information setting register 512.

The multilevel arbiter 500 is provided with an arbiter 511 that generates a second selection signal according to the ranking information output from the ranking information queue

2 and the queue #3 ranking information setting register 512 as well as a timer value output from the queue #2 timer 112 and the queue #3 timer 113.

The multilevel arbiter 500 is provided with a selector 114 for selecting and outputting a packet stored in the queue #2 or the queue #3 according to a second selection signal output from the arbiter 511.

Here, the output terminal of the selector 105 is connected to the ranking circuit 501. The output terminal of the ranking circuit 501 is connected to the ranking information queue #2.

The output terminals of the ranking information queue #2, the queue #2 timer 112, the queue #3 ranking information setting register 512, and of the queue #3 timer 113 are connected to the arbiter 511.

The output terminal of the arbiter 511 is connected to the selector 114.

In the above-described configuration, the selector 105 outputs a timer value output from the queue #0 timer 102 or a timer value output from the queue #1 timer 103 to the ranking circuit 501 in accordance with a first selection signal output from the arbiter 101.

The ranking information queue #2 sequentially stores the ranking information output from the ranking circuit 501, and outputs the ranking information to the arbiter 511 in the storing order.

The queue #2 timer 112 measures a period of time during which a packet is stored in the queue #2 and the stored packet is then selected and output by the selector 114, and outputs the measured timer value to the arbiter 511.

The queue #3 timer 113 measures a period of time during which a packet is stored in the queue #3 and the stored packet is then selected and output by the selector 114, and outputs the measured timer value to the arbiter 511.

When a request signal from queue #2 conflicts with a request signal from queue #3, i.e., when the output signal "1" is input from the queue #2 and the queue #3, the arbiter 511 generates a second selection signal in the following processes (1)-(5).

(1) The arbiter 511 compares the ranking information P2 of the queue #2 output from the ranking information queue #2 with the ranking information P3 of the queue #3 output from the queue #3 ranking information setting register 512.

(2) When P2≠P3, the arbiter 511 generates a second selection signal for the selector 114 to select the queue in which the rank is higher.

For example, when P2>P3, the arbiter 511 generates a second selection signal for the selector 114 to select the queue #2. When P2<P3, the arbiter 511 generates a second selection signal for the selector 114 to select the queue #3.

(3) When P2=P3, the arbiter 511 compares a timer value T2 output from the queue #2 timer 112 with a timer value T3 output from the queue #3 timer 113.

(4) When P2=P3 and T2≠T3, the arbiter 511 generates a second selection signal for the selector 114 to select the queue in which the timer value is larger.

For example, when T2>T3, the arbiter 511 generates a second selection signal for the selector 114 to select the queue #2. When T2<T3, the arbiter 511 generates a second selection signal for the selector 114 to select the queue #3.

(5) When P2=P3 and T2=T3, the arbiter 511 alternately generates a second selection signal for the selector 114 to select the output of the queue #2, and a second selection signal for the selector 114 to select the output of the queue #3.

For example, when a selection signal was previously generated for the selector 114 to select the output of the queue #2, the arbiter 511 generates a second selection signal for the selector 114 to select the output of the queue #3.

When a selection signal was previously generated for the selector 114 to select the output of the queue #3, the arbiter 511 generates a second selection signal for the selector 114 to select the output of the queue #2.

Once a second selection signal is generated in the processes above, the arbiter 511 outputs the second selection signal to the selector 114.

The selector 114 outputs a packet output from the queue #2 or the queue #3 in accordance with the second selection signal output from the arbiter 511.

Although the Joint Test Architecture Group (hereinafter, referred to as "JTAG") circuit 513 defined in IEEE1149.1 is used to set the ranking information to the queue #3 ranking information setting register 512 in the present embodiment, the present invention is not to be limited to this configuration. For example, the ranking information may be set to the queue #3 ranking information setting register 512 by using an SMBus circuit as appropriate.

Figure 6:
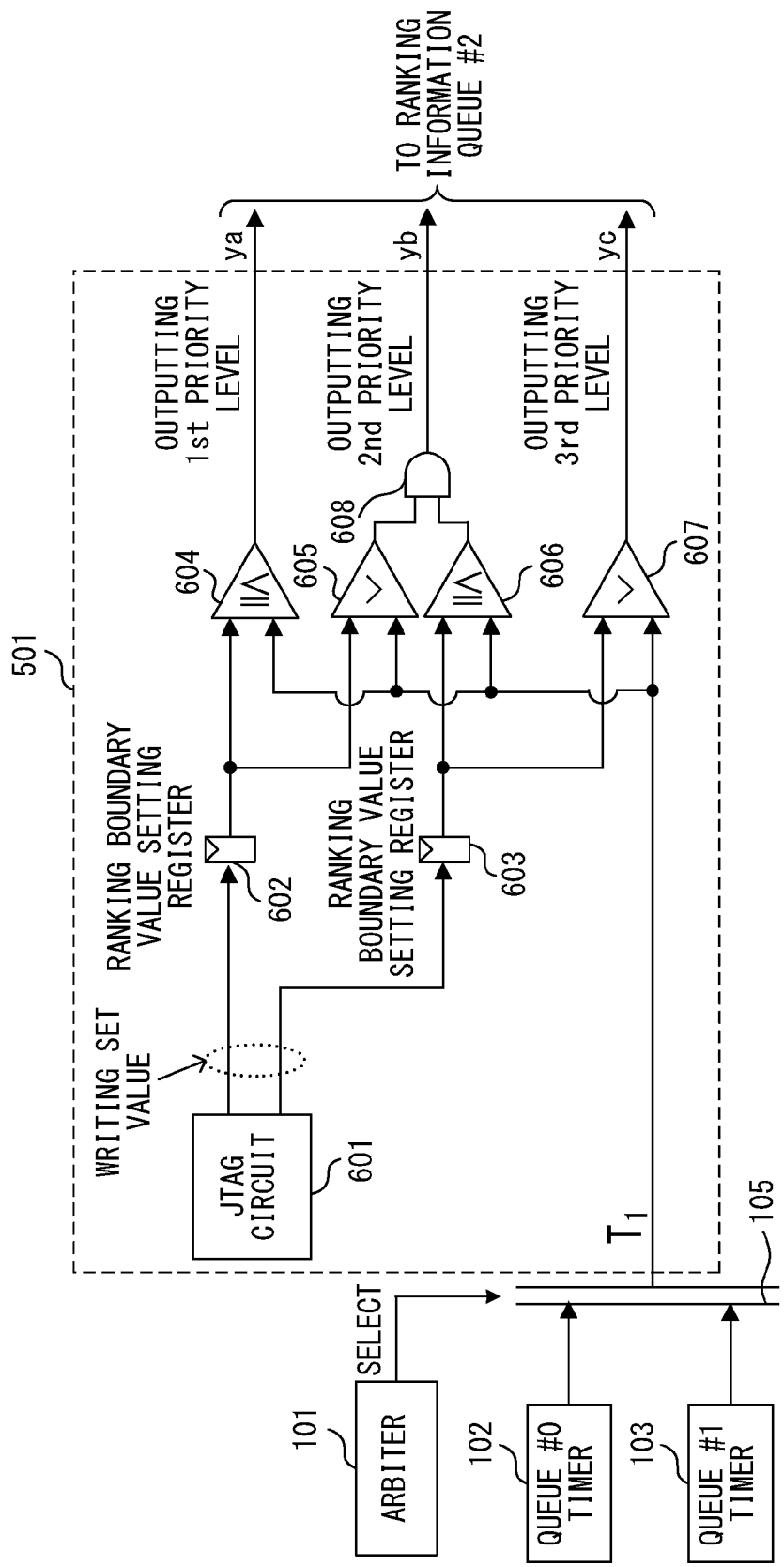
FIG. 6 is a diagram illustrating a specific configuration of a ranking circuit according to the second embodiment.

FIG. 6 is a diagram illustrating a specific configuration of a ranking circuit 501 according to the second embodiment.

The ranking circuit 501 is provided with a JTAG circuit 601 for setting a ranking boundary value to ranking boundary value setting registers 602 and 603.

The ranking circuit 501 is provided with the ranking boundary value setting registers 602 and 603 for storing a ranking boundary value.

It is assumed that Th1>Th2, where a ranking boundary value Th1 is the value that is set to the ranking boundary value setting register 602, and a ranking boundary value Th2 is the value that is set to the ranking boundary value setting register 603.

The ranking circuit 501 is provided with comparator circuits 604-607 that compare a ranking boundary value Th1 stored in the ranking boundary value setting register 602 and a ranking boundary value Th2 stored in the ranking boundary value setting register 603 with a timer value T1 output from the selector 105 to generate ranking information, and with a logical product circuit 608.

Here, the output terminal of the JTAG circuit 601 is connected to the ranking boundary value setting register 602 and the ranking boundary value setting register 603.

The output terminal of the ranking boundary value setting register 602 is connected to the comparator circuits 604 and 605, and the output terminal of the ranking boundary value setting register 603 is connected to the comparator circuits 606 and 607.

The output terminal of the selector 105 is connected to each of comparator circuits 604, 605, 606 and 607.

The output terminals of the comparator circuits 605 and 606 are connected to the logical product circuit 608.

In the above-described configuration, once a user specifies a desired register (ranking boundary value setting register 602 or 603) by performing a predetermined operation and specifies a desired ranking boundary value and performs a predetermined operation, the JTAG circuit 601 stores the specified ranking boundary value in the specified register by performing a scan shift.

The ranking boundary value setting register 602 is a register for setting a ranking boundary value that becomes a criteria for ranking the priority level as 1st.

When a timer value T1 output from the selector 105 is equal to or larger than the ranking boundary value Th1 set to the ranking boundary value setting register 602, the priority level of the queue #2 is ranked as 1st.

The ranking boundary value setting register 603 is a register for setting a ranking boundary value that becomes criteria for ranking the priority level as 2nd.

When a timer value output from the selector 105 is less than the ranking boundary value Th1 set to the ranking boundary value setting register 602 and is equal to or larger than the ranking boundary value Th2 set to the ranking boundary value setting register 603, the priority level of the queue #2 is ranked as 2nd.

When the timer value output from the selector 105 is less than the ranking boundary value Th2 set to the ranking boundary value setting register 603, the priority level of the queue #2 is ranked as 3rd.

The comparator circuits 604 and 605 compare the ranking boundary value Th1 set to the ranking boundary value setting register 602 with a timer value T1 output from the selector 105.

When a timer value T1 output from the selector 105 is equal to or larger than the ranking boundary value Th1 set to the ranking boundary value setting register 602, the comparator circuit 604 outputs "1". When a timer value T1 output from the selector 105 is less than the ranking boundary value Th1 set to the ranking boundary value setting register 602, the comparator circuit 604 outputs "0".

When a timer value T1 output from the selector 105 is less than the ranking boundary value Th1 set to the ranking boundary value setting register 602, the comparator circuit 605 outputs "1". When a timer value T1 output from the selector 105 is equal to or larger than the ranking boundary value Th1 set to the ranking boundary value setting register 602, the comparator circuit 605 outputs "0".

The comparator circuits 606 and 607 compare the ranking boundary value Th2 set to the ranking boundary value setting register 603 with a timer value T1 output from the selector 105.

When a timer value T1 output from the selector 105 is equal to or larger than the ranking boundary value Th2 set to the ranking boundary value setting register 603, the comparator circuit 606 outputs "1". When a timer value T1 output from the selector 105 is less than the ranking boundary value Th2 set to the ranking boundary value setting register 603, the comparator circuit 606 outputs "0".

When a timer value T1 output from the selector 105 is less than the ranking boundary value Th2 set to the ranking boundary value setting register 603, the comparator circuit 607 outputs "1". When a timer value T1 output from the selector 105 is equal to or larger than the ranking boundary value Th2 set to the ranking boundary value setting register 603, the comparator circuit 607 outputs "0".

The logical product circuit 608 outputs the logical product of an output value from the comparator circuit 605 and an output value from the comparator circuit 606.

Accordingly, when a timer value T1 output from the selector 105 is less than the ranking boundary value Th1 set to the ranking boundary value setting register 602 and is equal to or larger than the ranking boundary value Th2 set to the ranking boundary value setting register 603, the logical product circuit 608 outputs "1". In other cases, the logical product circuit 608 outputs "0".

Although the JTAG circuit 601 is used to set the ranking boundary value to the ranking boundary value setting registers 602 and 603 in the present embodiment, the present invention is not to be limited to this configuration. For example, the ranking boundary value may be set to the ranking boundary value setting registers 602 and 603 by using an SMBus circuit as appropriate.

Due to the processes above, ranking information (ya, yb, yc) is obtained.

When a timer value T1 is equal to or larger than the ranking boundary value Th1, i.e., when the priority level is ranked as 1st, the ranking information (ya, yb, yc) output from the ranking circuit 501 becomes (1, 0, 0).

When a timer value T1 is less than the ranking boundary value Th1 and is equal to or larger than the ranking boundary value Th2, i.e., when the priority level is ranked as 2nd, the ranking information (ya, yb, yc) becomes (0, 1, 0).

When a timer value T1 is less than the ranking boundary value Th2, i.e., when the priority level is ranked as 3rd, the ranking information (ya, yb, yc) becomes (0, 0, 1).

In the present embodiment, the above-mentioned ranking information (ya, yb, yc) is set to the queue #3 ranking information setting register 512.

Figure 7:
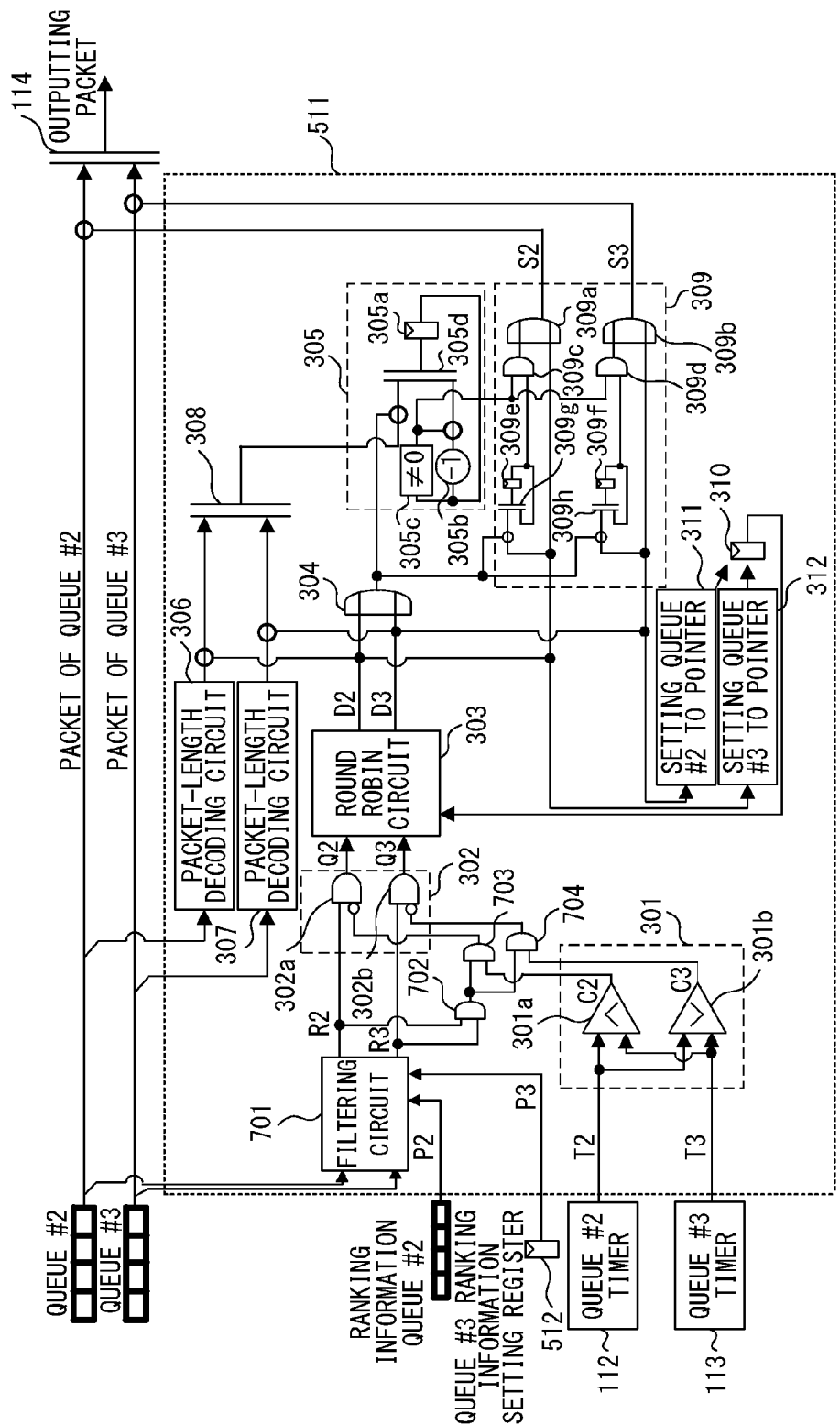
FIG. 7 is a diagram illustrating a specific configuration of an arbiter used in a multilevel arbiter according to the second embodiment.

FIG. 7 is a diagram illustrating a specific configuration of an arbiter 511 according to the second embodiment. The descriptions that overlap with those of the multilevel arbiter 111 of FIG. 3 will be omitted.

The arbiter 511 is provided with a filtering circuit 701 that filters out request signals from the queue #2 and queue #3 according to the ranking information, and with logical product circuits 702-704.

Moreover, the arbiter 511 is provided with the masking circuit 302 for masking a request signal R2 of the queue #2 or a request signal R3 of the queue #3 that are output from the filtering circuit 701 according to a signal from the timer value comparator circuit 301.

Here, the output terminals of the queue #2 and queue #3 and the output terminals of the ranking information queue #2 and the queue #3 ranking information setting register 512 are connected to the filtering circuit 701.

The output terminal of the filtering circuit 701 that outputs a request signal R2 of the queue #2 is connected to the logical product circuit 302a of the masking circuit 302 and to a logical product circuit 702. The output terminal of the filtering circuit 701 that outputs a request signal R3 of the queue #3 is connected to the logical product circuit 302b of the masking circuit 302 and to the logical product circuit 702.

The output terminal of the logical product circuit 702 is connected to the logical product circuits 703 and 704. The output terminal of the comparator circuit 301a of the timer value comparator circuit 301 is connected to the logical product circuit 703, and the output terminal of the comparator circuit 301b of the timer value comparator circuit 301 is connected to the logical product circuit 704.

The output terminal of the logical product circuit 703 is connected to the logical product circuit 302a of the masking circuit 302 via an inversion circuit. The output terminal of the logical product circuit 704 is connected to the logical product circuit 302b of the masking circuit 302 via an inversion circuit.

In the above-described configuration, the filtering circuit 701 performs the following processes (1)-(3).

Figure 8:
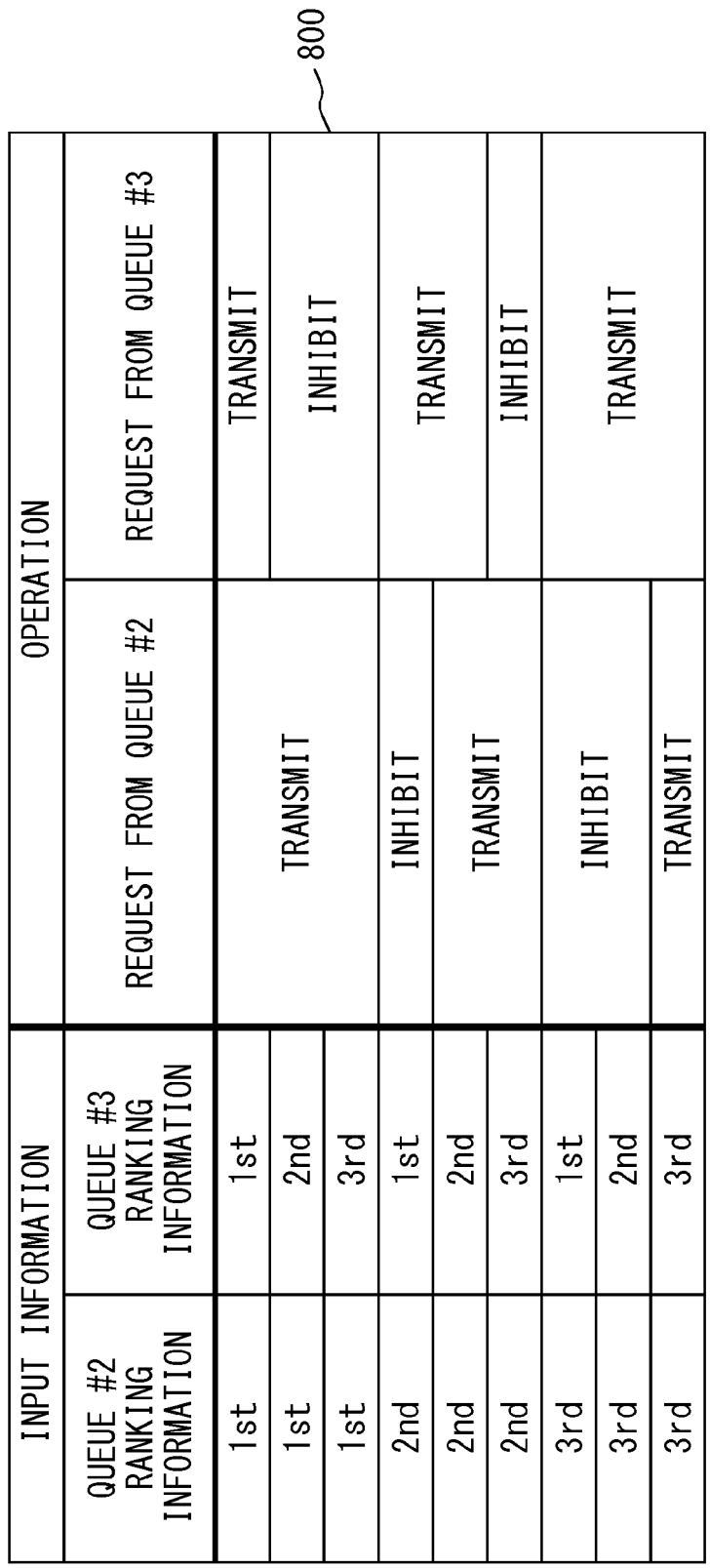
FIG. 8 is an example of a filtering table that is used by a selector circuit according to the second embodiment.

(1) Once the ranking information P2 of the queue #2 output from the ranking information queue #2 is received as well as the ranking information P3 of the queue #3 output from the queue #3 ranking information setting register 512, the filtering circuit 701 refers to a filtering table 800 of FIG. 8.

(2) The filtering circuit 701 searches for a combination that matches the combination of the ranking information P2 of the queue #2 and the ranking information P3 of the queue #3 by referring to "input" of the filtering table 800.

(3) The filtering circuit 701 outputs a request signal R2 of the queue #2 and a request signal R3 of the queue #3 to the masking circuit 302 in accordance with an "operation" that corresponds to the combination that matches the combination of the ranking information P2 of the queue #2 and the ranking information P3 of the queue #3.

For example, when a "request signal from queue #2" is defined as "transmit" in the filtering table 800, the request signal R2 of the queue #2 output from the filtering circuit 701 to the logical product circuit 302a of the masking circuit 302 becomes "1".

In a similar manner, when a "request signal from queue #3" is defined as "transmit" in the filtering table 800, the request signal R3 of the queue #3 output from the filtering circuit 701 to the logical product circuit 302b of the masking circuit 302 becomes "1".

When a "request signal from queue #2" is defined as "inhibit" in the filtering table 800, the filtering circuit 701 inhibits a request signal from queue #2. In this case, the filtering circuit 701 outputs "0" to the logical product circuit 302a of the masking circuit 302.

In a similar manner, when a "request signal from queue #3" is defined as "inhibit" in the filtering table 800, the filtering circuit 701 inhibits a request signal from queue #3. In this case, the filtering circuit 701 outputs "0" to the logical product circuit 302b of the masking circuit 302.

Due to the processes above, the filtering circuit 701 selects a request signal from queue #2 or a request signal from queue #3 according to the ranking information P2 of the queue #2 and the ranking information P3 of the queue #3, and outputs the selected request signal to the masking circuit 302.

The operations of the filtering circuit 701 are different from the processes (1)-(3) above when request signals from the queue #2 and queue #3 do not conflict with each other.

For example, when a request signal is received only from the queue #2, the filtering circuit 701 outputs "R2=1" and "R3=0". When a request signal is received only from the queue #3, the filtering circuit 701 outputs "R2=0" and "R3=1".

The logical product circuit 702 outputs a logical product of output signals R2 and R3 of the filtering circuit 701 to the logical product circuits 703 and 704.

The logical product circuit 703 outputs a logical product of an output signal of the logical product circuit 702 and an output signal of the comparator circuit 301a. The logical product circuit 704 outputs a logical product of an output signal of the logical product circuit 702 and an output signal of the comparator circuit 301b.

The logical product circuit 302a outputs a logical product of an output signal R2 output from the filtering circuit 701 and an inversion signal of an output signal output from the logical product circuit 703. The logical product circuit 302b outputs a logical product of an output signal R3 output from the filtering circuit 701 and an inversion signal of an output signal output from the logical product circuit 704.

Due to the processes above, output signals Q2 and Q3 output from the masking circuit 302 will be as represented in Table 1 below.

It is to be noted that the priority level indicated by the ranking information output from the ranking information queue #2 is "P2", and the priority level indicated by the ranking information output from the queue #3 ranking information setting register 512 is "P3".

Moreover, a timer value output from the queue #2 timer 112 is "T2", and a timer value output from the queue #3 timer 113 is "T3".

The output signals output from the filtering circuit 701 are "R2" and "R3", and the output signals output from the timer value comparator circuit 301 are "C2" and "C3". The outputs from the masking circuit 302 are "Q2" and "Q3".

TABLE 1

| PRIORITY LEVEL | TIMER VALUE | OUTPUT OF SELECTOR CIRCUIT 701 | | INVERSION OUTPUT OF TIMER VALUE COMPARATOR CIRCUIT 301 | | OUTPUTS OF MASKING CIRCUIT 302 | |
|---|---|---|---|---|---|---|---|
| | | R2 | R3 | C2/ | C3/ | Q2 | Q3 |
| P2 > P3 | T2 > T3 | 1 | 0 | 1 | 0 | 1 | 0 |
| | T2 = T3 | 1 | 0 | 1 | 1 | 1 | 0 |
| | T2 < T3 | 1 | 0 | 0 | 1 | 1 | 0 |
| P2 = P3 | T2 > T3 | 1 | 1 | 1 | 0 | 1 | 0 |
| | T2 = T3 | 1 | 1 | 1 | 1 | 1 | 1 |
| | T2 < T3 | 1 | 1 | 0 | 1 | 0 | 1 |
| P2 < P3 | T2 > T3 | 0 | 1 | 1 | 0 | 0 | 1 |
| | T2 = T3 | 0 | 1 | 1 | 1 | 0 | 1 |
| | T2 < T3 | 0 | 1 | 0 | 1 | 0 | 1 |

FIG. 8 is an example of the filtering table 800 that is used by the filtering circuit 701.

The filtering table 800 is a table in which the rank information input to the filtering circuit 701 and the operation of the filtering circuit 701 according to the rank information are defined.

The rank information input to the filtering circuit 701 includes the ranking information P2 input from the ranking information queue #2 to the filtering circuit 701, and the ranking information P3 input from the queue #3 ranking information setting register 512 to the filtering circuit 701.

Moreover, the operations of the filtering circuit 701 are defined to be "transmit" and "inhibit" depending on the rank information.

The term "transmit" indicates the operation of outputting the request signal from queue #2 or queue #3 input to the filtering circuit 701 to the masking circuit 302 and the logical product circuit 702.

For example, when it is defined to "transmit" a request signal from the queue #2, the filtering circuit 701 outputs a request signal R2 from queue #2, i.e., "1", to the logical product circuit 302a and the logical product circuit 702.

In a similar manner, when it is defined to "transmit" a request signal from the queue #3, the filtering circuit 701 outputs a request signal R3 from queue #3, i.e., "1", to the logical product circuit 302b and the logical product circuit 702.

The term "inhibit" indicates the operation of not outputting the request signal from queue #2 or queue #3 input to the filtering circuit 701 to the masking circuit 302 and the logical product circuit 702. In this case, for example, the filtering circuit 701 outputs "0" to the masking circuit 302 and the logical product circuit 702 regardless of the existence of a request signal from queue #2 or queue #3.

Figure 9:
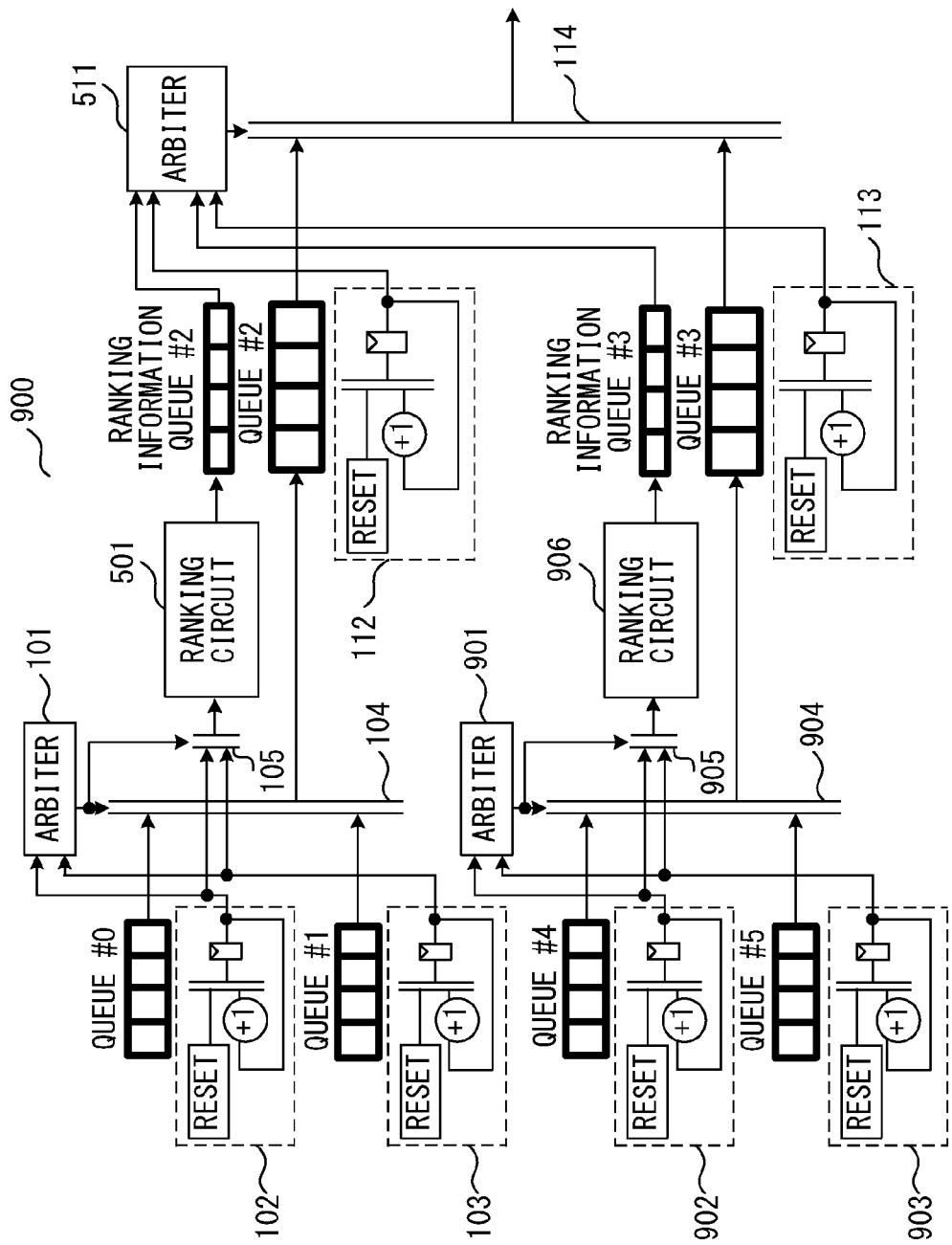
FIG. 9 is a diagram illustrating a modification of the multilevel arbiter 500 according to the second embodiment.

FIG. 9 is a diagram illustrating a modification of the multilevel arbiter 500 according to the second embodiment. The descriptions that overlap with those of the multilevel arbiter 500 of FIG. 5 will be omitted.

In addition to the configuration of the multilevel arbiter 500 of FIG. 5, a multilevel arbiter 900 of FIG. 9 is provided with the following elements.

The multilevel arbiter 900 is provided with an arbiter 901 for generating a third selection signal according to a timer value output from a queue #4 timer 902 and a timer value output from a queue #5 timer 903.

The multilevel arbiter 900 is provided with a queue #4 that holds and outputs a packet, and a queue #4 timer 902 that measures a period of time during which the packet is stored in the queue #4 and then is output.

The multilevel arbiter 900 is provided with a queue #5 that holds and outputs a packet, and a queue #5 timer 903 that measures a period of time during which the packet is stored in the queue #5 and then is output.

The multilevel arbiter 900 is provided with a selector 904 that selects a packet output from the queue #4 or a packet output from the queue #5 according to a third selection signal output from the arbiter 901.

The multilevel arbiter 900 is provided with a selector 905 that selects a timer value output from the queue #4 timer 902 or the queue #5 timer 903 according to a third selection signal output from the arbiter 901.

The multilevel arbiter 900 is provided with a ranking circuit 906 for ranking the queue #3 according to a timer value output from the selector 905.

The multilevel arbiter 900 is provided with a ranking information queue #3 for holding and outputting the ranking information output from the ranking circuit 906.

Here, the output terminal of the queue #4 and the queue #5 are connected to the selector 904. The output terminals of the queue #4 timer 902 and the queue #5 timer 903 are connected to the arbiter 901 and the selector 905.

The output terminal of the arbiter 901 is connected to the selector 904 and the selector 905.

The output terminal of the selector 904 is connected to the queue #3, and the output terminal of the selector 905 is connected to the ranking circuit 906. The output terminal of the ranking circuit 906 is connected to the ranking information queue #3.

The output terminal of the ranking information queue #3 is connected to the arbiter 511.

The operations of the arbiter 901, the queue #4, the queue #4 timer 902, the queue #5, the queue #5 timer 903, the selector 904, the selector 905, the ranking circuit 906 and the ranking information queue #3 are similar to the operations of the arbiter 101, the queue #0, the queue #0 timer 102, the queue #1, the queue #1 timer 103, the selector 104, the selector 105, the ranking circuit 501, and the ranking information queue #2 of FIG. 5, and thus detailed description will be omitted.

Figure 10A:
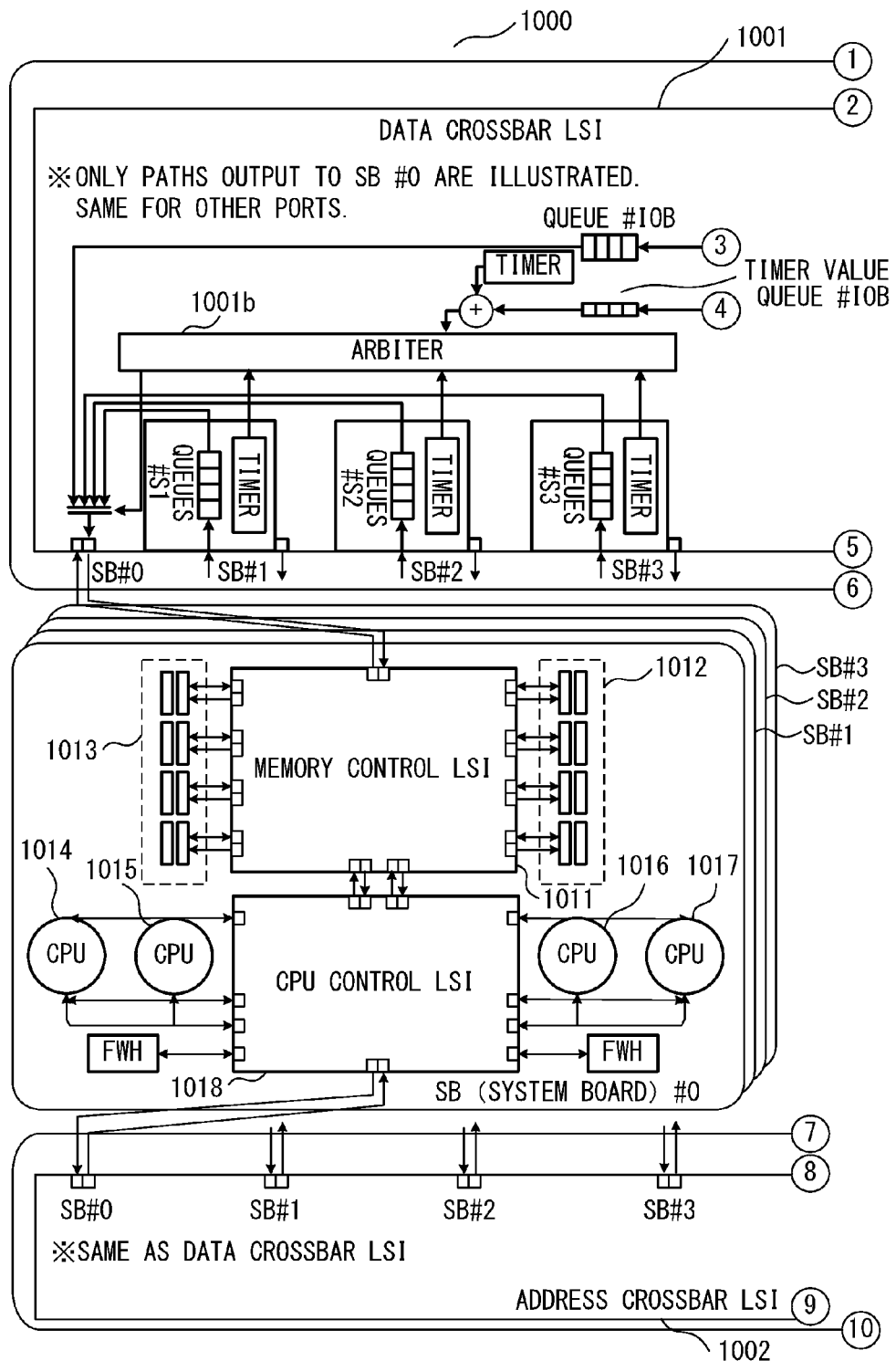
FIG. 10A is a diagram illustrating a main part of the computer system to which a multilevel arbiter according to the first embodiment is applied.

FIGS. 10A and 10B is a diagram illustrating a main part of the computer system to which the multilevel arbiter 100 according to the first embodiment is applied.

A computer system 1000 of FIGS. 10A and 10B is provided with SBs (system boards) #0-#3, IOBs (I/O boards) #0-#3, a data crossbar LSI 1001, and an address crossbar LSI 1002.

In FIGS. 10A and 10B, out of the SBs #0-#3 only the SB #0 is illustrated. Moreover, out of the IOBs #0-#3 only the IOB #0 is illustrated.

The SB #0 is provided with memory 1012 and 1013, and a memory control LSI 1011 that controls the memory 1012 and 1013. Moreover, the SB #0 is provided with CPUs 1014-1017, and a CPU control LSI 1018 that controls the CPUs 1014-1017, and a FWH (firmware hub). The same may be said for the SBs #1-#3.

The IOB #0 is provided with an IO control LSI 1021, PCI control LSIs 1022 and 1023, ICHs (I/O Controller Hub) 1024 and 1025, FWH, a VGA (Video Graphics Array) terminal, an SIO (Serial Input/Output) terminal, a LAN (Local Area Network) terminal, a BMC (Baseboard Management Controller) terminal. The same may be said for the IOBs #1-#3.

It should be understood that the configuration of the SBs #0-#3 and the IOBs #0-#3 is illustrated in FIGS. 10A and 10B just for the purpose of exemplification, and the present invention is not limited to the illustrated configuration. Regarding the elements that constitute the SB #0 and the IOB #0 of FIGS. 10A and 10B, the description will be omitted as they are well-known in the art.

The output terminal SB #0 of the data crossbar LSI 1001 is connected to an input terminal of the memory control LSI 1011 of the SB #0. To the input terminals SB #1, SB #2 and SB #3 of the data crossbar LSI 1001, output terminals of the memory control LSI 1011 of the SB #1, SB #2, and SB #3 are connected, respectively.

To the input terminals IOB #0, IOB#1, IOB#2, and IOB#3 of the data crossbar LSI 1001, output terminals of the IO control LSI of the IOB #0, IOB#1, IOB#2, and IOB#3 are connected, respectively.

The input terminals IOB #0, IOB#1, IOB#2, and IOB#3 are connected to queues #I0, #I1, #I2, and #I3. The input terminals SB #1, SB #2 and SB #3 are connected to queues #S1, #S2, and #S3.

The data crossbar LSI 1001 is provided with the following elements.

An arbiter 1001a performs an operation equivalent to that of the arbiter 101 of FIG. 1. An arbiter 1001b performs an operation equivalent to that of the arbiter 111 of FIG. 1. An arbiter 1001c performs an operation equivalent to that of the selector 104 of FIG. 1. An selector 1001d performs an operation equivalent to that of the selector 105 of FIG. 1.

The queues #I0-#I3 perform an operation equivalent to that of the queues #0-#1 of FIG. 1. A queue #IOB performs an operation equivalent to that of the queue #2 of FIG. 1. A timer value queue #IOB performs an operation equivalent to that of the timer value queue #2 of FIG. 1. The queues #S1-#S3 perform an operation equivalent to that of the queue #3 of FIG. 1. The timers perform an operation equivalent to that of the queue timer of FIG. 1.

As described above, the multilevel arbiter 100 to which the arbiter 1001a and the arbiter 1001b are connected at multiple levels may be applied to the data crossbar LSI 1001.

Although a packet is transmitted from an IOB to an SB in FIGS. 10A and 10B, a packet may be transmitted from an SB to an IOB in the configuration in which the multilevel arbiter 100 is applied to the data crossbar LSI 1001.

The multilevel arbiter 100 may also be applied to the address crossbar LSI 1002 in a similar manner as the data crossbar LSI 1001.

Figure 11B:
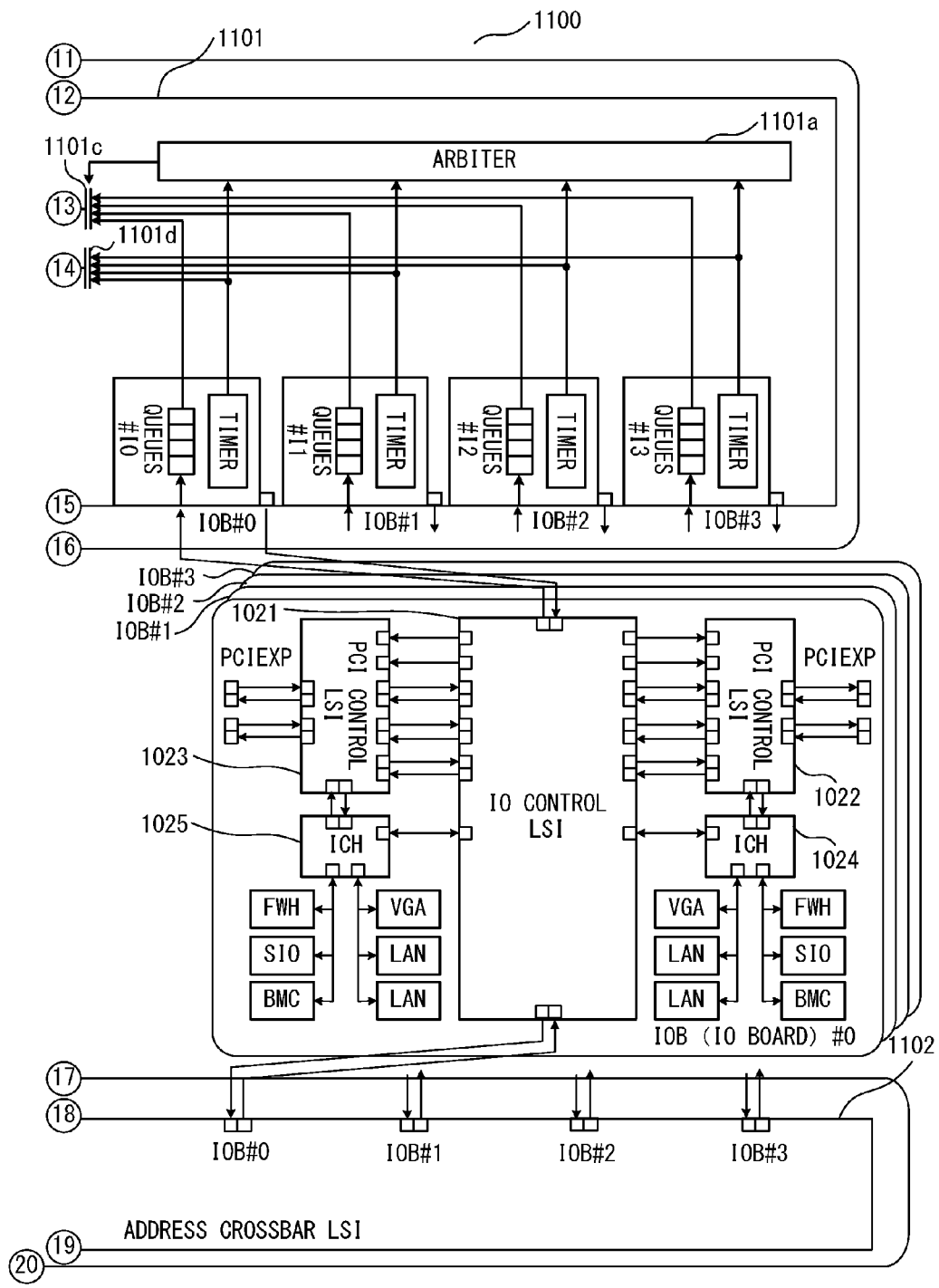
FIG. 11B is a diagram illustrating a main part of the computer system to which a multilevel arbiter according to the second embodiment is applied.
Figure 12:
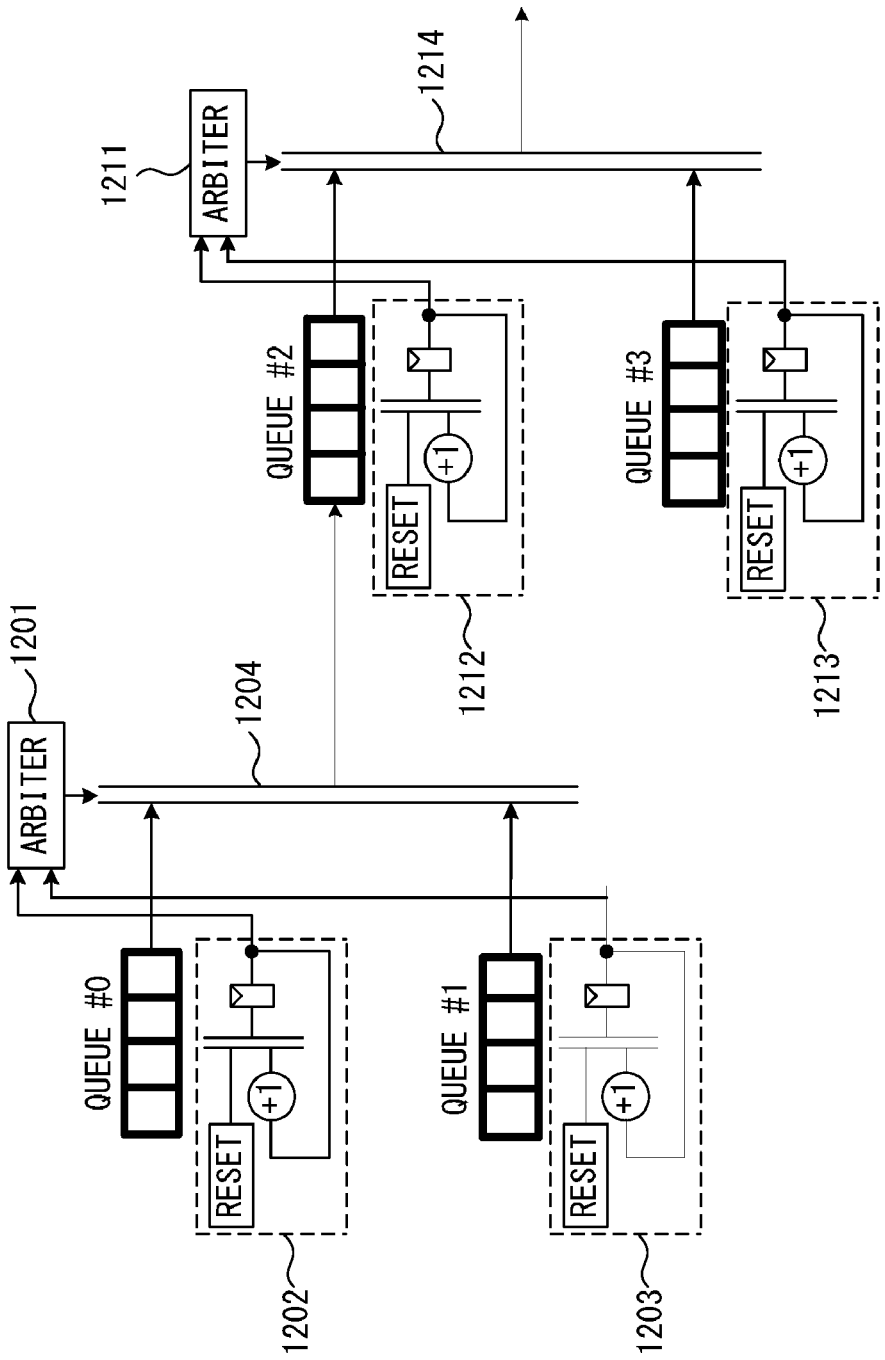
FIG. 12 is an example of a multilevel arbiter.

FIG. 11 is a diagram illustrating a main part of the computer system to which the multilevel arbiter 500 according to the second embodiment is applied. The description of the configuration of the SBs #0-#3 and IOBs #0-#3 will be omitted, as it is similar to that of FIGS. 10A and 10B.

The arbiter 1101a performs an operation equivalent to that of the arbiter 101 of FIG. 5. The arbiter 1101b performs an operation equivalent to that of the arbiter 511 of FIG. 5.

The selector 1101c performs an operation equivalent to that of the selector 104 of FIG. 5. The selector 1101d performs an operation equivalent to that of the selector 105 of FIG. 5.

The ranking circuit 1101e performs an operation equivalent to that of the ranking circuit 501 of FIG. 5. The ranking information setting register 1101f performs an operation equivalent to that of the queue #3 ranking information setting register 512 of FIG. 5.

Queues #I0-I3 perform an operation equivalent to that of the queues #0-#1 of FIG. 5. The queue #IOB performs an operation equivalent to that of the queue queue #2 of FIG. 5. The ranking information queue #IOB performs an operation equivalent to that of the ranking information queue #2 of FIG. 5. The queues #S1-S3 perform an operation equivalent to that of the queue #3.

The timers perform an operation equivalent to the queue timer of FIG. 5.

As described above, the multilevel arbiter 500 to which the arbiter 1101a and the arbiter 1101b are connected at multiple levels may be applied to the data crossbar LSI 1101.

Although a packet is transmitted from an IOB to an SB in FIG. 11, a packet may be transmitted from an SB to an IOB in the configuration in which the multilevel arbiter 500 is applied to the data crossbar LSI 1101.

The multilevel arbiter 500 may also be applied to the address crossbar LSI 1102 in a similar manner as the data crossbar LSI 1101.

As described above, in the multilevel arbiter 100 according to the first embodiment, a time value of the packet selected by the arbiter 101 at the former level is stored in the timer value queue #2. Subsequently, the arbiter 111 at the latter level compares a timer value output from the timer value queue #2 to which a timer value output from the queue #2 timer 112 is added with a timer value output from the queue #3 timer 113.

The arbiter 111 at the latter level generates a second selection signal for selecting a packet of the queue of a larger timer value between a timer value of the queue #2 to which a timer value of the queue #0 or #1 is added and a timer value of the queue #3.

As a result, the arbiter 111 at the latter level arbitrates a packet of the queue #2 and a packet of the queue #3 in view of a latency time at the former level, i.e., in view of a period of time during which a packet is stored in the queue #0 or #1, and then the arbiter 101 selects the stored packet and outputs the selected packet to the queue #2.

Accordingly, the multilevel arbiter 100 is capable of minimizing the latency time required to pass through the multilevel arbiter 100.

In the multilevel arbiter 400 according to a modification of the first embodiment, a timer value of the packet selected by the arbiter 101 at the former level is stored in the timer value queue #2, and a timer value of the packet selected by the arbiter 401 at the former level is stored in the timer value queue #3.

The arbiter 411 at the latter level compares a timer value output from the queue #2 timer 112 to which a timer value output from the timer value queue #2 is added with a timer value output from the queue #3 timer 113 to which a timer value output from the timer value queue #3 is added.

The arbiter 411 generates a second selection signal for selecting a packet output from the queue of a larger timer value between a timer value of the queue #2 to which a timer value at the queue #0 or #1 is added and a timer value of the queue #3 to which a timer value of the queue #4 or #5 is added.

As a result, the arbiter 411 at the latter level arbitrates a packet of the queue #2 and a packet of the queue #3 in view of a latency time at the former level, i.e., in view of a period of time during which a packet is stored in the queue #0 or #1, and then the arbiter 101 selects the stored packet and outputs the selected packet to the queue #2.

Simultaneously, the arbiter 411 at the latter level arbitrates a packet of the queue #2 and a packet of the queue #3 in view of a latency time at the former level, i.e., in view of a period of time during which a packet is stored in the queue #4 or #5, and then the arbiter 401 selects the stored packet and outputs the selected packet to the queue #3.

Accordingly, the multilevel arbiter 400 is capable of minimizing the latency time required to pass through the multilevel arbiter 400 having a number of arbiters at multiple levels for one arbiter.

In the multilevel arbiter 500 according to the second embodiment, the ranking circuit 501 generates the ranking information such that a priority level will be higher when a timer value of the packet selected by the arbiter 101 at the former level is larger. The ranking information is stored in the ranking information queue #2 in an order corresponding to the packet stored in the queue #2.

The arbiter 511 at the latter level compares the ranking information output from the ranking information queue #2 with the ranking information output from the queue #3 ranking information setting register 512. According to the result of comparison, the arbiter 511 generates a second selection signal for selecting a packet output from the queue whose priority level is higher.

As a result, the arbiter 511 at the latter level arbitrates a packet of the queue #2 and a packet of the queue #3 in view of a latency time at the former level, i.e., in view of a period of time during which a packet is stored in the queue #0 or #1, and then the arbiter 101 selects the stored packet and outputs the selected packet to the queue #2.

Accordingly, the multilevel arbiter 500 is capable of minimizing the latency time required to pass through the multilevel arbiter 500.

When the priority is the same, the arbiter 511 compares a timer value output from the queue #2 timer 112 with a timer value output from the queue #3 timer 113. According to the result of comparison, the arbiter 511 generates a second selection signal for selecting a packet output from the queue whose timer value is larger.

As a result, even if the priority level is the same, the multilevel arbiter 500 is capable of arbitrating a packet output from the queue #2 or queue #3 according to a timer value output from the queue #2 timer 112 or queue #3 timer 113.

When the timer values are the same, the arbiter 511 generates a second selection signal for alternately selecting between a packet output from the queue #2 and a packet output from the queue #3.

As a result, even if the priority level is the same and the timer values are the same, the multilevel arbiter 500 is capable of arbitrating a packet output from the queue #2 or queue #3.

In the multilevel arbiter 900 according to a modification of the second embodiment, the ranking circuit 501 generates the ranking information such that a priority level will be higher when a timer value of the packet selected by the arbiter 101 at the former level is larger. The ranking information is stored in the ranking information queue #2 in an order corresponding to the packet stored in the queue #2.

In a similar manner, the ranking circuit 906 generates the ranking information such that a priority level will be higher when a timer value of the packet selected by the arbiter 901 at the former level is larger. The ranking information is stored in the ranking information queue #3 in an order corresponding to the packet stored in the queue #3.

The arbiter 511 at the latter level compares the ranking information output from the ranking information queue #2 with the ranking information output from the ranking information queue #3. According to the result of comparison, the arbiter 511 generates a second selection signal for selecting a packet output from the queue whose priority level is higher.

As a result, the arbiter 511 at the latter level arbitrates a packet of the queue #2 and a packet of the queue #3 in view of a latency time at the former latter level, i.e., in view of a period of time during which a packet is stored in the queue #0 or #1, and then the arbiter 101 selects the stored packet and outputs the selected packet to the queue #2.

Simultaneously, the arbiter 511 at the latter level arbitrates a packet of the queue #2 and a packet of the queue #3 in view of a latency time at the former level, i.e., in view of a period of time during which a packet is stored in the queue #4 or #5 and then the arbiter 901 selects the stored packet and outputs the selected packet to the queue #3.

Accordingly, the multilevel arbiter 900 is capable of minimizing the latency time required to pass through the multilevel arbiter 900 having a number of arbiters at multiple levels for one arbiter.

In the arbitration device provided with the elements described above, the second control circuit outputs the second selection signal on the basis of either the first or second data which is selected by the second selection circuit or on the basis of the third data.

The third selection circuit selects and outputs, on the basis of the second selection signal, the third data or either the first or second data which is selected and output by the first selection circuit.

Therefore, even if an arbiter is arranged at multiple levels, an arbitration device capable of minimizing the latency time required for a packet to pass through the multilevel arbiter can be provided according to the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An arbitration device comprising:
   a first storage circuit configured to hold first data;
   a second storage circuit configured to hold second data;
   a first selection circuit connected to the first storage circuit and the second storage circuit, and configured to select the first data or the second data according to a first selection signal;
   a first measuring circuit configured to measure a first period during which the first selection circuit selects the first data;
   a second measuring circuit configured to measure a second period during which the first selection circuit selects the second data;
   a second selection circuit connected to the first measuring circuit and the second measuring circuit, and configured to select the first period or the second period according to the first selection signal;
   a first control circuit configured to output the first selection signal according to the first period and the second period;
   a third storage circuit configured to hold either the first data or the second data which is selected by the first selection circuit;
   a fourth storage circuit configured to hold third data;
   a third selection circuit connected to the third storage circuit and the fourth storage circuit, and configured to select the third data or either the first data or the second data which is selected by the first selection circuit according to a second selection signal;
   a third measuring circuit configured to measure a third period during which the third selection circuit selects either the first data or the second data;
   a fourth measuring circuit configured to measure a fourth period during which the third selection circuit selects the third data; and
   a second control circuit configured to output the second selection signal according to either the selected first period or the selected second period and the third period and the fourth period.

2. The arbitration device according to claim 1, wherein
   the second control circuit compares the fourth period with either the first period or the second period selected by the second selection circuit to which the third period is added, and selects the third data or either the first data or the second data according to a comparison result.

3. The arbitration device according to claim 1, wherein
   the second control circuit compares the fourth period with either the first period or the second period selected by the second selection circuit to which the third period is added, and selects the third data or either the first data or the second data whichever has a longer period.

4. The arbitration device according to claim 1, wherein
   the second control circuit compares the fourth period with either the first period or the second period selected by the second selection circuit to which the third period is added, and selects the third data or either the first data or the second data that is different from the previously selected data when the fourth period matches with either the first period or the second period selected by the second selection circuit to which the third period is added.

5. The arbitration device according to claim 1, wherein
   the first measuring circuit initializes the first period when the first selection circuit selects the first data,
   the second measuring circuit initializes the second period when the first selection circuit selects the second data,
   the third measuring circuit initializes the third period when the third selection circuit selects either the first data or the second data selected by the first selection circuit, and
   the fourth measuring circuit initializes the fourth period when the third selection circuit selects the third data.

6. The arbitration device according to claim 1, further comprising:
   a fifth storage circuit configured to hold fourth data;
   a sixth storage circuit configured to hold fifth data;
   a fourth selection circuit connected to the fifth storage circuit and the sixth storage circuit, and configured to select the fourth data or the fifth data according to a third selection signal;
   a fifth measuring circuit configured to measure a fifth period during which the fourth selection circuit selects the fourth data;
   a sixth measuring circuit configured to measure a sixth period during which the fourth selection circuit selects the fifth data;
   a fifth selection circuit connected to the fifth measuring circuit and the sixth measuring circuit, and configured to select the fifth period and the sixth period according to the third selection signal; and
   a third control circuit configured to output the third selection signal according to the fifth period and the sixth period, wherein
   the fourth storage circuit holds one of the fourth data or the fifth data selected by the fourth selection circuit,
   the third selection circuit selects one of either the first data or the second data which is selected by the first selection circuit, or the fourth data or the fifth data selected by the fourth selection circuit,
   the fourth measuring circuit measures a fourth period during which the third selection circuit selects either the fourth data or the fifth data, and the second control circuit outputs the second selection signal according to either the selected first period or the selected second period, or according to either the selected fifth period or the selected sixth period.

7. An arbitration method for an arbitration device including a first storage circuit configured to hold first data and a second storage circuit configured to hold second data, the arbitration method comprising:
  measuring a first period during which the first data is selected;
  measuring a second period during which the second data is selected;
  selecting the first data or the second data according to the first period and the second period;
  selecting the first period or the second period according to the first period and the second period;
  holding either the selected first data or the selected second data in a third storage circuit;
  measuring a third period during which either the first data or the second data is selected;
  holding third data in a fourth storage circuit;
  measuring a fourth period during which the third data is selected; and
  selecting the third data or either the selected first data or the selected second data according to either the selected first period or the selected second period and the third period and the fourth period.

8. An information processing device, comprising:
  an arithmetic device configured to execute a predetermined instruction;
  an input/output control device configured to control an input/output of data to an external input/output device; and
  an arbitration device configured to arbitrate data transmitted and received between the arithmetic device and the input/output control device, the arbitration device including
    a first storage circuit configured to hold first data,
    a second storage circuit configured to hold second data,
    a first selection circuit connected to the first storage circuit and the second storage circuit, and configured to select the first data or the second data according to a first selection signal,
    a first measuring circuit configured to measure a first period during which the first selection circuit selects the first data,
    a second measuring circuit configured to measure a second period during which the first selection circuit selects the second data,
    a second selection circuit connected to the first measuring circuit and the second measuring circuit, and configured to select the first period or the second period according to the first selection signal,
    a first control circuit configured to output the first selection signal according to the first period and the second period,
    a third storage circuit configured to hold either the first data or the second data which is selected by the first selection circuit,
    a fourth storage circuit configured to hold third data,
    a third selection circuit connected to the third storage circuit and the fourth storage circuit, and configured to select the third data or either the first data or the second data which is selected a by the first selection circuit according to a second selection signal,
    a third measuring circuit configured to measure a third period during which the third selection circuit selects either the first data or the second data,
    a fourth measuring circuit configured to measure a fourth period during which the third selection circuit selects the third data, and
    a second control circuit configured to output the second selection signal according to either the selected first period or the selected second period and the third period and the fourth period.

* * * * *